(12) United States Patent
Lundmark et al.

(10) Patent No.: US 11,830,460 B2
(45) Date of Patent: Nov. 28, 2023

(54) SYSTEMS AND METHODS FOR VIRTUAL AND AUGMENTED REALITY

(71) Applicant: MAGIC LEAP, INC., Plantation, FL (US)

(72) Inventors: David Charles Lundmark, Los Altos, CA (US); Gregory Michael Broadmore, Wellington (NZ)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/095,666

(22) Filed: Nov. 11, 2020

(65) Prior Publication Data

US 2021/0151010 A1     May 20, 2021

Related U.S. Application Data

(60) Provisional application No. 62/935,587, filed on Nov. 14, 2019.

(51) Int. Cl.
*G09G 5/00* (2006.01)
*G09G 5/377* (2006.01)
*G06T 11/00* (2006.01)
*G09G 5/38* (2006.01)
*G02B 27/01* (2006.01)

(52) U.S. Cl.
CPC ......... *G09G 5/377* (2013.01); *G02B 27/0172* (2013.01); *G06T 11/00* (2013.01); *G09G 5/38* (2013.01); *G02B 2027/014* (2013.01); *G02B 2027/0138* (2013.01); *G02B 2027/0141* (2013.01); *G09G 2340/0464* (2013.01); *G09G 2340/12* (2013.01); *G09G 2354/00* (2013.01)

(58) Field of Classification Search
CPC ...... G09G 5/377; G09G 5/38; G02B 27/0172; G06T 11/00
See application file for complete search history.

(56) References Cited

U.S. PATENT DOCUMENTS

2018/0045963 A1* 2/2018 Hoover .................. G06F 3/013
2018/0255285 A1* 9/2018 Hall ........................ A63G 7/00
(Continued)

FOREIGN PATENT DOCUMENTS

WO    WO-2020205968 A1 * 10/2020 .............. G06F 3/011

OTHER PUBLICATIONS

Cha, M., Han, S., Lee, J., & Choi, B. (2012). A virtual reality based fire training simulator integrated with fire dynamics data. Fire Safety Journal, 50, 12-24.*
(Continued)

*Primary Examiner* — Sarah Lhymn
(74) *Attorney, Agent, or Firm* — Vista IP Law Group, LLP

(57) ABSTRACT

An apparatus configured to be head-worn by a user, includes: a transparent screen configured to allow the user to see therethrough; a sensor system configured to sense a characteristic of a physical object in an environment in which the user is located; and a processing unit coupled to the sensor system, the processing unit configured to: cause the screen to display a user-controllable object, and cause the screen to display an image of a feature that is resulted from a virtual interaction between the user-controllable object and the physical object, so that the feature will appear to be a part of the physical object in the environment or appear to be emanating from the physical object.

21 Claims, 29 Drawing Sheets

(56) References Cited

U.S. PATENT DOCUMENTS

| | | | |
|---|---|---|---|
| 2019/0011702 A1* | 1/2019 | Zhang | F41H 1/04 |
| 2019/0236842 A1* | 8/2019 | Bennett | G06F 3/04815 |

OTHER PUBLICATIONS

Feldman, B. E., O'brien, J. F., & Arikan, O. (2003). Animating suspended particle explosions. In ACM SIGGRAPH 2003 Papers (pp. 708-715).*

Chen, X. S., Liu, C. C., & Wu, I. C. (2018). A BIM-based visualization and warning system for fire rescue. Advanced Engineering Informatics, 37, 42-53.*

* cited by examiner

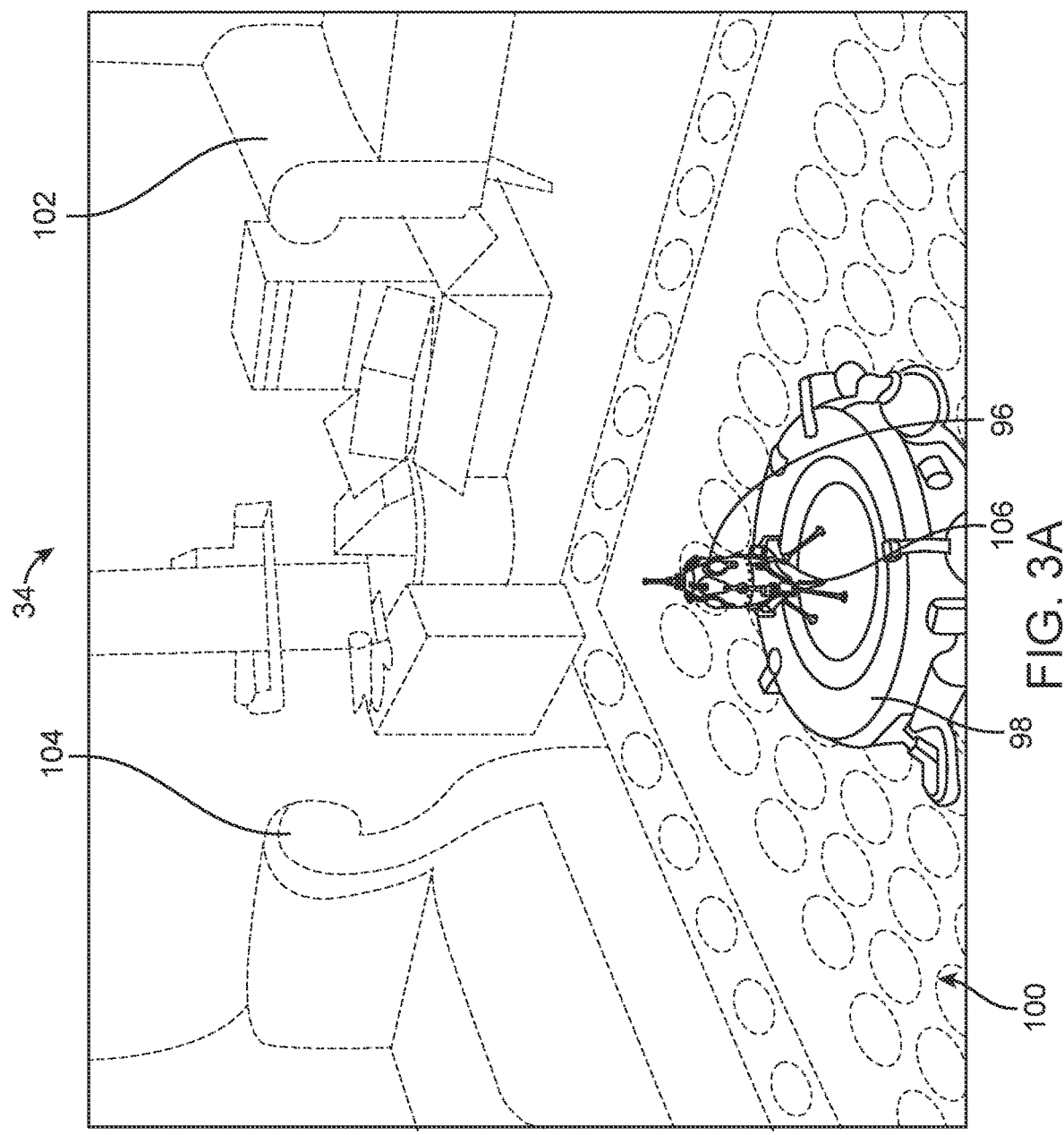

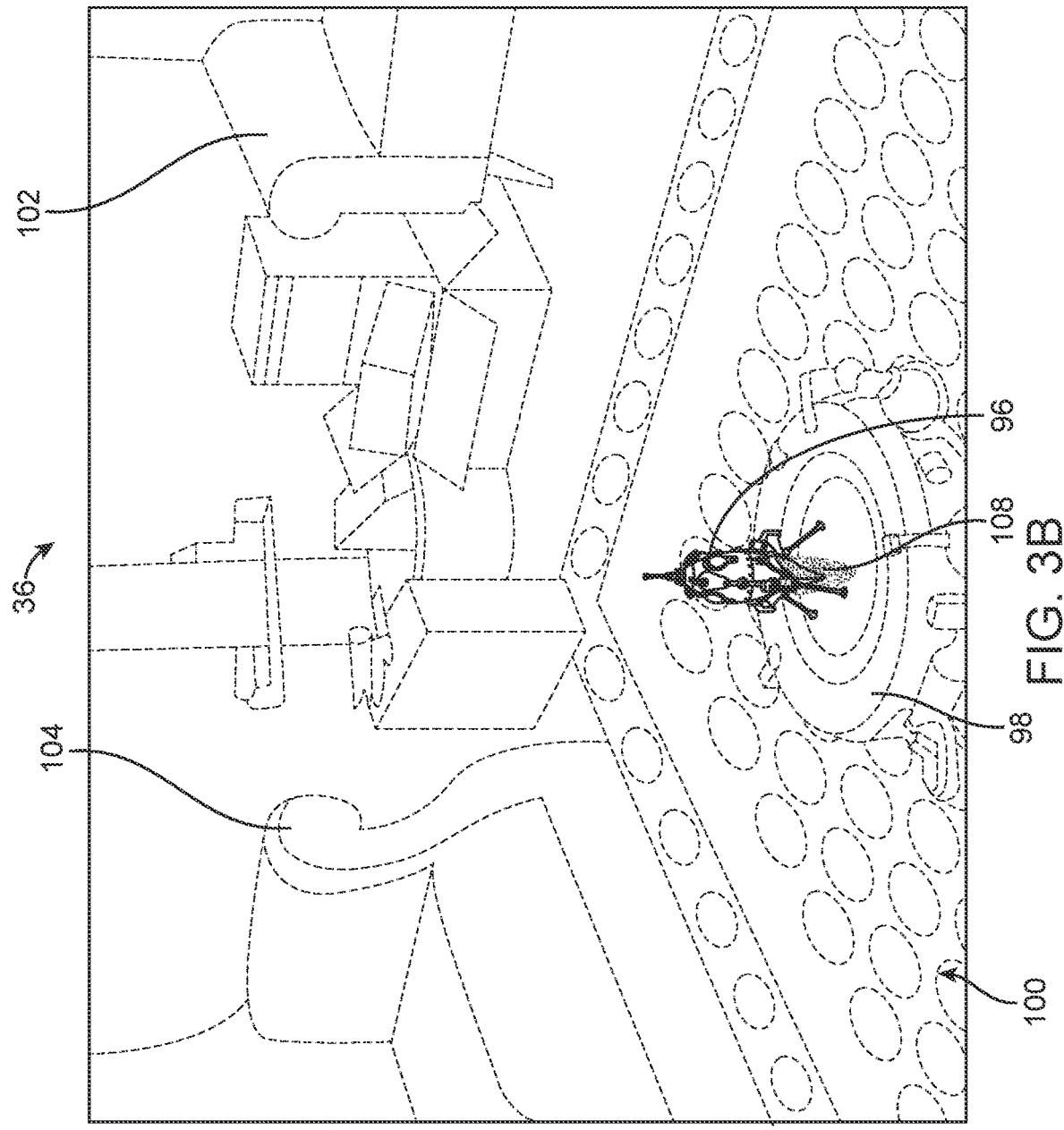

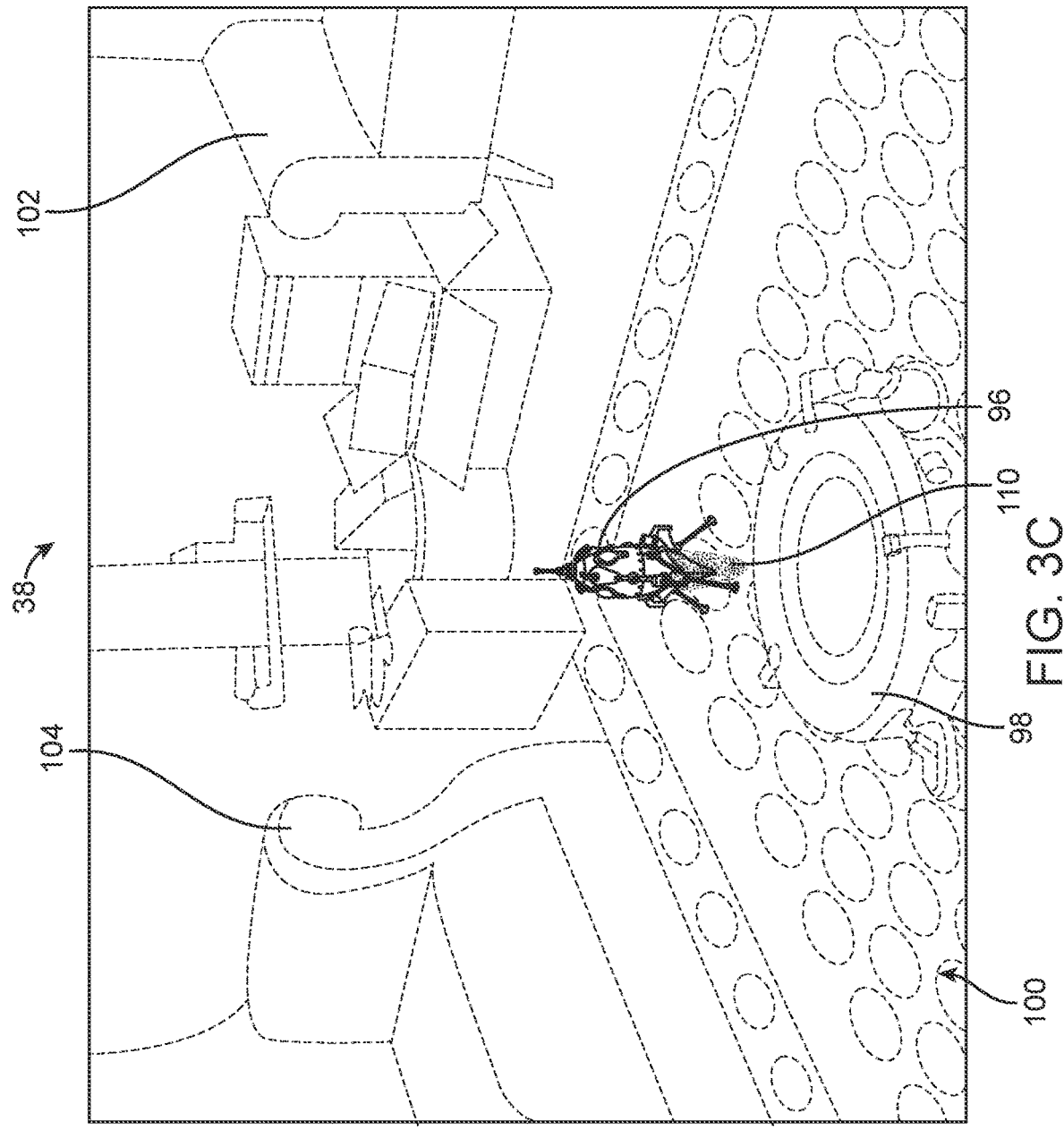

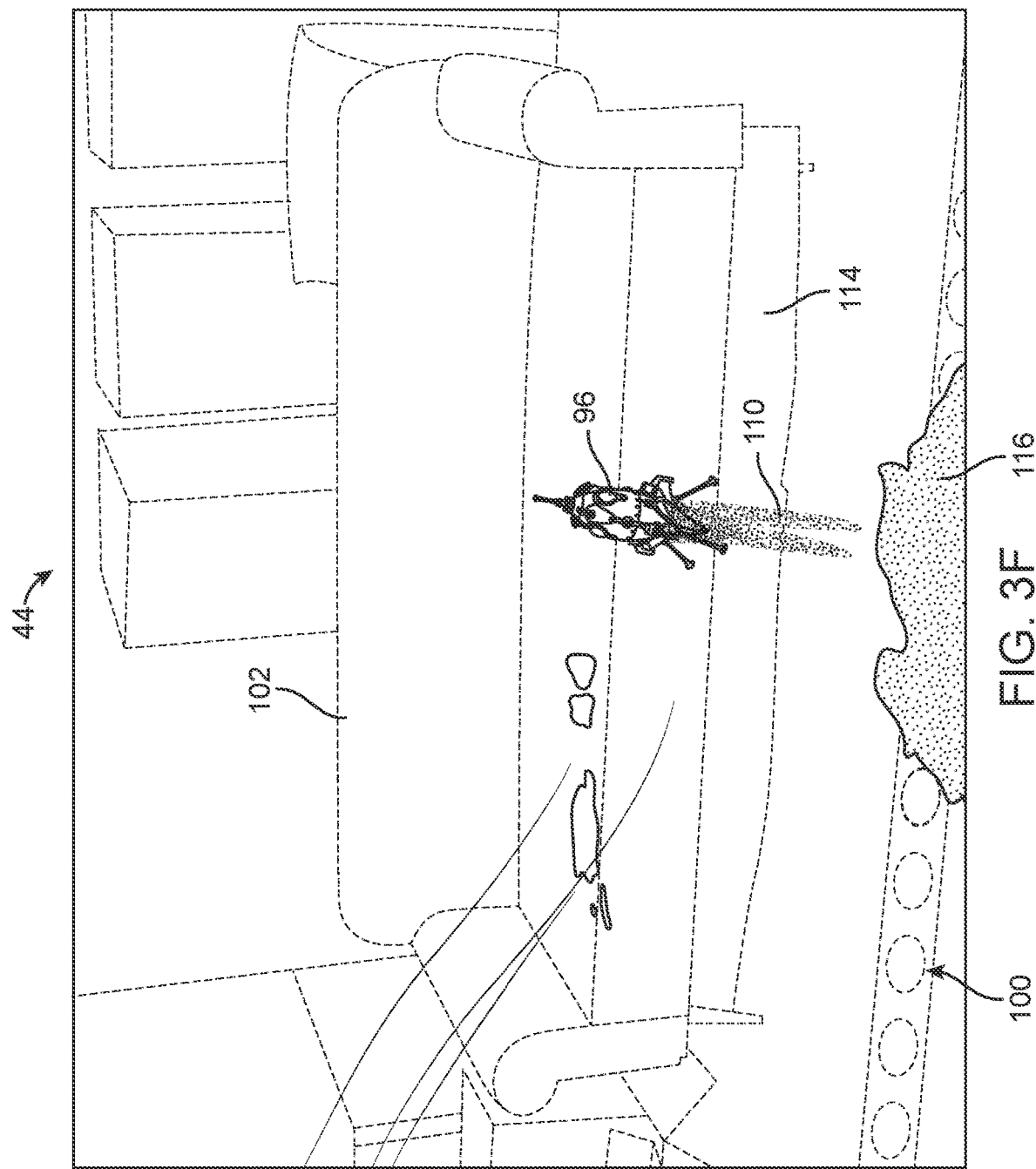

SYSTEMS AND METHODS FOR VIRTUAL AND AUGMENTED REALITY

RELATED APPLICATION DATA

This application claims priority to, and the benefit of, U.S. Provisional Patent Application No. 62/935,587, filed on Nov. 14, 2019. The entire disclosure of the above application is expressly incorporated by reference herein.

FIELD

The present disclosure relates to connected mobile computing systems, methods, and configurations, and more specifically to mobile computing systems, methods, and configurations featuring at least one wearable component which may be utilized for virtual and/or augmented reality operation.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (e.g., semi-transparent or full-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment.

It is desirable that mixed reality, or augmented reality, near-eye displays be lightweight, low-cost, have a small form-factor, have a wide virtual image field of view, and be as transparent as possible. In addition, it is desirable for these displays to present virtual image information in multiple focal planes (for example, two or more) in order to be practical for a wide variety of use-cases.

SUMMARY

Methods and apparatuses for displaying object image (virtual object) on a transparent screen of an image display device are described herein. The virtual object is displayed so that it appears to be interacting with real physical object as viewed by a user through the screen. Methods and apparatuses for displaying interaction image representing the interaction between the virtual object and the real physical object are also described herein. Providing interaction image is advantageous because it enhances the user's experience when using the image display device. In some cases, the interaction image may provide realism in representing the nature of interaction between the virtual object and the real physical object. In gaming applications, such features may provide a more enjoyable and fun experience for the user of the image display device.

An apparatus configured to be head-worn by a user, includes: a transparent screen configured to allow the user to see therethrough; a sensor system configured to sense a characteristic of a physical object in an environment in which the user is located; and a processing unit coupled to the sensor system, the processing unit configured to: cause the screen to display a graphical item so that the graphical item will appear to be in a spatial relationship with respect to the physical object in the environment, determine a virtual distance between a reference position associated with the graphical item and the physical object, and cause the screen to display a heat visualization upon a satisfaction of a criteria by the virtual distance.

Optionally, a configuration of the heat visualization is variable depending on the determined virtual distance between the reference position associated with the graphical item and the physical object.

Optionally, the heat visualization has a first configuration when the virtual distance between the reference position associated with the graphical item and the physical object has a first value; and wherein the heat visualization has a second figuration when the virtual distance between the reference position associated with the graphical item and the physical object has a second value that is different from the first value.

Optionally, the heat visualization comprises an image of a burnt mark positioned in correspondence with the physical object so that the physical object has an appearance of being burnt.

Optionally, the heat visualization has a first configuration when the virtual distance between the reference position associated with the graphical item and the physical object is less than a first threshold.

Optionally, the heat visualization has a second configuration that is different from the first configuration when the virtual distance between the reference position associated with the graphical item and the physical object is less than a second threshold, wherein the second threshold is less than the first threshold.

Optionally, the first configuration of the heat visualization comprises a first burnt mark, and the second configuration of the heat visualization comprises a second burnt mark that is more severe than the first burnt mark.

Optionally, the first configuration of the heat visualization comprises a burnt mark, and the second configuration of the heat visualization comprises an image of fire, an image of a destroyed structure, or an image of an explosion.

Optionally, the processing unit is configured to receive a user input, and to adjust a position of the graphical item being displayed on the screen based on the user input.

Optionally, the sensor system comprises a depth sensor configured to provide a sensor output; and wherein the processing unit is configured to determine the virtual distance between the reference position associated with the graphical item and the physical object based on the sensor output.

Optionally, the sensor system comprises a camera configured to provide an image of the environment; and wherein the processing unit is configured to identify the physical object in the image.

Optionally, the graphical item comprises an image of a vehicle.

Optionally, the graphical item comprises an image of a thrust.

Optionally, the graphical item comprises an image of a vehicle, and wherein the processing unit is also configured to receive a user input, and to cause the screen to display a thrust visualization in association with the image of the vehicle in response to the user input.

Optionally, the processing unit is configured to cause the screen to display a change in the thrust visualization in response to a change in the user input.

Optionally, the processing unit is configured to cause the screen to display a transformation of the heat visualization so that the heat visualization disappears over time.

Optionally, the processing unit is configured to cause the screen to display the heat visualization as a permanent overlay over the physical object.

Optionally, the heat visualization comprises an image of a burnt mark.

Optionally, the heat visualization comprises an image of an explosion.

Optionally, the heat visualization comprises an image of a destroyed structure.

Optionally, the heat visualization comprises an image of smoke.

An apparatus configured to be head-worn by a user, includes: a transparent screen configured to allow the user to see therethrough; a sensor system configured to sense a characteristic of a physical object in an environment in which the user is located; and a processing unit coupled to the sensor system, the processing unit configured to: cause the screen to display a user-controllable object, and cause the screen to display an image of a feature that is resulted from a virtual interaction between the user-controllable object and the physical object, so that the feature will appear to be a part of the physical object in the environment or appear to be emanating from the physical object.

Optionally, the image of the feature comprises an image of a burnt mark for the physical object.

Optionally, the image of the feature comprises an image of an explosion for the physical object.

Optionally, the image of the feature comprises an image of a destroyed structure for the physical object.

Optionally, the image of the feature comprises an image of smoke for the physical object.

Optionally, the processing unit is configured to cause the screen to display a transformation of the feature so that the feature disappears over time.

Optionally, the processing unit is configured to cause the screen to display the image of the feature as a permanent overlay over the physical object.

Optionally, the processing unit is configured to change a configuration of the image of the feature based on a viewing orientation of the user.

Optionally, the virtual interaction between the user-controllable object and the physical object comprises a direction interaction or an indirect interaction.

Optionally, the image of the feature comprises a heat visualization.

Optionally, a configuration of the heat visualization is variable depending on a virtual distance between a reference position associated with the user-controllable object and the physical object.

Optionally, the heat visualization has a first configuration when a virtual distance between a reference position associated with the user-controllable object and the physical object has a first value; and wherein the heat visualization has a second figuration when the virtual distance between the reference position associated with the user-controllable object and the physical object has a second value that is different from the first value.

Optionally, the heat visualization has a first configuration when a virtual distance between the reference position associated with the user-controllable object and the physical object is less than a first threshold.

Optionally, the heat visualization has a second configuration that is different from the first configuration when the virtual distance between the reference position associated with the user-controllable object and the physical object is less than a second threshold, wherein the second threshold is less than the first threshold.

Optionally, the first configuration of the heat visualization comprises a first burnt mark, and the second configuration of the heat visualization comprises a second burnt mark that is more severe than the first burnt mark.

Optionally, the first configuration of the heat visualization comprises a burnt mark, and the second configuration of the heat visualization comprises an image of fire, an image of a destroyed structure, or an image of an explosion.

Optionally, the sensor system comprises a depth sensor configured to provide a sensor output; and wherein the processing unit is configured to determine a position of the physical object based on the sensor output.

Optionally, the sensor system comprises a camera configured to provide an image of the environment; and wherein the processing unit is configured to identify the physical object in the image.

Optionally, the user-controllable object comprises an image of a vehicle.

Optionally, the user-controllable object comprises an image of a thrust.

Optionally, the user-controllable object comprises an image of a vehicle, and wherein the processing unit is also configured to receive a user input, and to cause the screen to display a thrust visualization in association with the image of the vehicle in response to the user input.

Optionally, the processing unit is configured to cause the screen to display a change in the thrust visualization in response to a change in the user input.

Optionally, the processing unit is configured to receive a user input, and to adjust a position of the user-controllable object being displayed on the screen based on the user input.

A method performed by a head-worn image display device, includes: obtaining a sensor output from a sensor system of the head-worn image display device; identifying a physical object in an environment in which a user of the head-worn display device is located based on the sensor output; displaying a graphical item in a transparent screen of the head-worn image display device so that the graphical item will appear to be in a spatial relationship with respect to the physical object in the environment as viewed through the transparent screen; determining a virtual distance between a reference position associated with the graphical item and the physical object, and displaying a heat visualization upon a satisfaction of a criteria by the virtual distance.

Optionally, a configuration of the heat visualization is variable depending on the determined virtual distance between the reference position associated with the graphical item and the physical object.

Optionally, the heat visualization has a first configuration when the virtual distance between the reference position associated with the graphical item and the physical object has a first value; and wherein the heat visualization has a second figuration when the virtual distance between the reference position associated with the graphical item and the physical object has a second value that is different from the first value.

Optionally, the heat visualization comprises an image of a burnt mark positioned in correspondence with the physical object so that the physical object has an appearance of being burnt.

Optionally, the heat visualization has a first configuration when the virtual distance between the reference position associated with the graphical item and the physical object is less than a first threshold.

Optionally, the heat visualization has a second configuration that is different from the first configuration when the virtual distance between the reference position associated with the graphical item and the physical object is less than a second threshold, wherein the second threshold is less than the first threshold.

Optionally, the first configuration of the heat visualization comprises a first burnt mark, and the second configuration of the heat visualization comprises a second burnt mark that is more severe than the first burnt mark.

Optionally, the first configuration of the heat visualization comprises a burnt mark, and the second configuration of the heat visualization comprises an image of fire, an image of a destroyed structure, or an image of an explosion.

Optionally, the method further includes receiving a user input, and adjusting a position of the graphical item being displayed on the screen based on the user input.

Optionally, the sensor system comprises a depth sensor configured to provide a sensor output; and wherein the virtual distance between the reference position associated with the graphical item and the physical object is determined based on the sensor output.

Optionally, the sensor system comprises a camera configured to provide an image of the environment; and wherein the physical object is identified based on the image.

Optionally, the graphical item comprises an image of a vehicle.

Optionally, the graphical item comprises an image of a thrust.

Optionally, the graphical item comprises an image of a vehicle, and wherein the method further comprises receiving a user input, and displaying a thrust visualization in association with the image of the vehicle in response to the user input.

Optionally, the method further includes changing the thrust visualization in response to a change in the user input.

Optionally, the method further includes displaying a transformation of the heat visualization so that the heat visualization disappears over time.

Optionally, the heat visualization is displayed as a permanent overlay over the physical object.

Optionally, the heat visualization comprises an image of a burnt mark.

Optionally, the heat visualization comprises an image of an explosion.

Optionally, the heat visualization comprises an image of a destroyed structure.

Optionally, the heat visualization comprises an image of smoke.

A non-transitory medium includes stored instructions, an execution of which by a processing unit of a head-worn image display device will cause a method to be performed, the method comprising: obtaining a sensor output from a sensor system of the head-worn image display device; identifying a physical object in an environment in which a user of the head-worn display device is located based on the sensor output; displaying a graphical item in a transparent screen of the head-worn image display device so that the graphical item will appear to be in a spatial relationship with respect to the physical object in the environment as viewed through the transparent screen; determining a virtual distance between a reference position associated with the graphical item and the physical object, and displaying a heat visualization upon a satisfaction of a criteria by the virtual distance.

A method performed by a head-worn image display device, includes: sensing a characteristic of a physical object in an environment in which a user is located; displaying a user-controllable object in a transparent screen of the head-worn image display device, and displaying an image of a feature that is resulted from a virtual interaction between the user-controllable object and the physical object as viewed through the transparent screen of the head-worn image display device, so that the feature will appear to be a part of the physical object in the environment or appear to be emanating from the physical object.

Optionally, the image of the feature comprises an image of a burnt mark for the physical object.

Optionally, the image of the feature comprises an image of an explosion for the physical object.

Optionally, the image of the feature comprises an image of a destroyed structure for the physical object.

Optionally, the image of the feature comprises an image of smoke for the physical object.

Optionally, the method further includes displaying a transformation of the feature so that the feature disappears over time.

Optionally, the image of the feature is displayed as a permanent overlay over the physical object.

Optionally, the method further includes changing a configuration of the image of the feature based on a viewing orientation of the user.

Optionally, the virtual interaction between the user-controllable object and the physical object comprises a direction interaction or an indirect interaction.

Optionally, the image of the feature comprises a heat visualization.

Optionally, a configuration of the heat visualization is variable depending on a virtual distance between a reference position associated with the user-controllable object and the physical object.

Optionally, the heat visualization has a first configuration when a virtual distance between a reference position associated with the user-controllable object and the physical object has a first value; and wherein the heat visualization has a second figuration when the virtual distance between the reference position associated with the user-controllable object and the physical object has a second value that is different from the first value.

Optionally, the heat visualization has a first configuration when a virtual distance between the reference position associated with the user-controllable object and the physical object is less than a first threshold.

Optionally, the heat visualization has a second configuration that is different from the first configuration when the virtual distance between the reference position associated with the user-controllable object and the physical object is less than a second threshold, wherein the second threshold is less than the first threshold.

Optionally, the first configuration of the heat visualization comprises a first burnt mark, and the second configuration of the heat visualization comprises a second burnt mark that is more severe than the first burnt mark.

Optionally, the first configuration of the heat visualization comprises a burnt mark, and the second configuration of the heat visualization comprises an image of fire, an image of a destroyed structure, or an image of an explosion.

Optionally, the sensor system comprises a depth sensor configured to provide a sensor output; and wherein the method further includes determining a position of the physical object based on the sensor output.

Optionally, the sensor system comprises a camera configured to provide an image of the environment; and wherein the method further includes identifying the physical object in the image.

Optionally, the user-controllable object comprises an image of a vehicle.

Optionally, the user-controllable object comprises an image of a thrust.

Optionally, the user-controllable object comprises an image of a vehicle, and wherein the method further includes receiving a user input, and displaying a thrust visualization in association with the image of the vehicle in response to the user input.

Optionally, the method further includes displaying a change in the thrust visualization in response to a change in the user input.

Optionally, the method further includes receiving a user input, and adjusting a position of the user-controllable object being displayed on the screen based on the user input.

A non-transitory medium includes stored instructions, an execution of which by a processing unit of a head-worn image display device will cause a method to be performed, the method comprising: sensing a characteristic of a physical object in an environment in which a user is located; displaying a user-controllable object in a transparent screen of the head-worn image display device, and displaying an image of a feature that is resulted from a virtual interaction between the user-controllable object and the physical object as viewed through the transparent screen of the head-worn image display device, so that the feature will appear to be a part of the physical object in the environment or appear to be emanating from the physical object.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 3A-3I illustrates examples of different views as seen through a screen of the image display device of FIG. 1A.

DETAILED DESCRIPTION

Figure 1A:
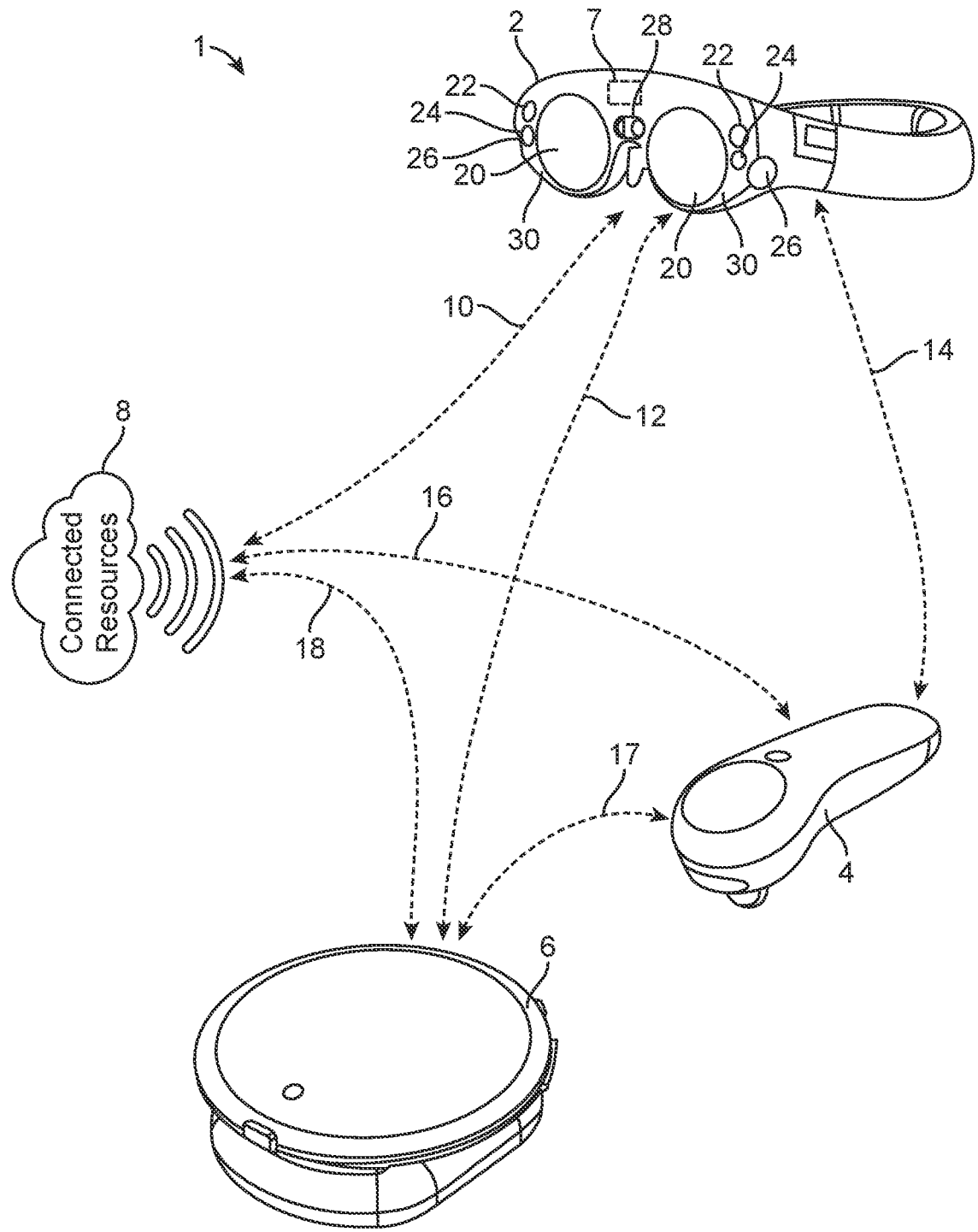
FIG. 1A illustrates an image display system having an image display device in accordance with some embodiments.

Various embodiments of the disclosure are directed to methods, apparatuses, and articles of manufacture for providing input for head-worn video image devices. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

Referring to FIG. 1A, an augmented reality system 1 is illustrated featuring a head-worn viewing component (image display device) 2, a hand-held controller component 4, and an interconnected auxiliary computing or controller component 6 which may be configured to be worn as a belt pack or the like on the user. Each of these components may be operatively coupled (10, 12, 14, 16, 17, 18) to each other and to other connected resources 8 such as cloud computing or cloud storage resources via wired or wireless communication configurations, such as those specified by IEEE 802.11, Bluetooth®, and other connectivity standards and configurations. As described, for example, in U.S. patent application Ser. Nos. 14/555,585, 14/690,401, 14/331,218, 15/481,255, 62/627,155, 62/518,539, 16/229,532, 16/155,564, 15/413,284, 16/020,541, 62/702,322, 62/206,765, 15/597,694, 16/221,065, 15/968,673, 62/682,788, and 62/899,678 each of which is incorporated by reference herein in its entirety, various aspects of such components are described, such as various embodiments of the two depicted optical elements 20 through which the user may see the world around them along with visual components which may be produced by the associated system components, for an augmented reality experience. As illustrated in FIG. 1A, such a system 1 may also comprise various sensors configured to provide information pertaining to the environment around the user, including but not limited to various camera type sensors (such as monochrome, color/RGB, and/or thermal imaging components) (22, 24, 26), depth camera sensors 28, and/or sound sensors 30 such as microphones. There is a need for compact and persistently connected wearable computing systems and assemblies such as those described herein, which may be utilized to provide a user with the perception of rich augmented reality experiences, along with development tools related thereto.

The system 1 also includes an apparatus 7 for providing input for the image display device 2. The apparatus 7 will be described in further detail below. The image display device 2 may be a VR device, an AR device, a MR device, or any of other types of display devices. As shown in the figure, the image display device 2 includes a frame structure worn by an end user, a display subsystem carried by the frame structure, such that the display subsystem is positioned in front of the eyes of the end user, and a speaker carried by the frame structure, such that the speaker is positioned adjacent the ear canal of the end user (optionally, another speaker (not shown) is positioned adjacent the other ear canal of the end user to provide for stereo/shapeable sound control). The display subsystem is designed to present the eyes of the end user with light patterns that can be comfortably perceived as augmentations to physical reality, with high-levels of image quality and three-dimensional perception, as well as being capable of presenting two-dimensional content. The display subsystem presents a sequence of frames at high frequency that provides the perception of a single coherent scene.

In the illustrated embodiments, the display subsystem employs "optical see-through" display through which the user can directly view light from real objects via transparent (or semi-transparent) elements. The transparent element, often referred to as a "combiner," superimposes light from the display over the user's view of the real world. To this end, the display subsystem comprises a partially transparent display or a complete transparent display. The display is positioned in the end user's field of view between the eyes of the end user and an ambient environment, such that direct light from the ambient environment is transmitted through the display to the eyes of the end user.

In the illustrated embodiments, an image projection assembly provides light to the partially transparent display, thereby combining with the direct light from the ambient environment, and being transmitted from the display to the eyes of the user. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem may be monocular or binocular.

The image display device 2 may also include one or more sensors mounted to the frame structure for detecting the position and movement of the head of the end user and/or the eye position and inter-ocular distance of the end user. Such sensors may include image capture devices (such as cameras), microphones, inertial measurement units, accelerometers, compasses, GPS units, radio devices, and/or gyros), or any combination of the foregoing. Many of these sensors operate on the assumption that the frame on which they are affixed is in turn substantially fixed to the user's head, eyes, and ears.

The image display device 2 may also include a user orientation detection module. The user orientation module detects the instantaneous position of the head of the end user (e.g., via sensors coupled to the frame) and may predict the position of the head of the end user based on position data received from the sensors. Detecting the instantaneous position of the head of the end user facilitates determination of the specific actual object that the end user is looking at, thereby providing an indication of the specific virtual object to be generated in relation to that actual object and further providing an indication of the position in which the virtual object is to be displayed. The user orientation module may also track the eyes of the end user based on the tracking data received from the sensors.

The image display device 2 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 2 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem.

The apparatus 7 represents the various processing components for the system 1. In the figure, the apparatus 7 is illustrated as a part of the image display device 2. In other embodiments, the apparatus 7 may be implemented in the handheld controller component 4, and/or in the controller component 6. In further embodiments, the various processing components of the apparatus 7 may be implemented in a distributed subsystem. For example, the processing components of the apparatus 7 may be located in two or more of: the image display device 2, in the handheld controller component 4, in the controller component 6, or in another device (that is in communication with the image display device 2, the handheld controller component 4, and/or the controller component 6).

The couplings 10, 12, 14, 16, 17, 18 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. Thus, the particular choice of wired or wireless communications should not be considered limiting.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 1 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 1B:
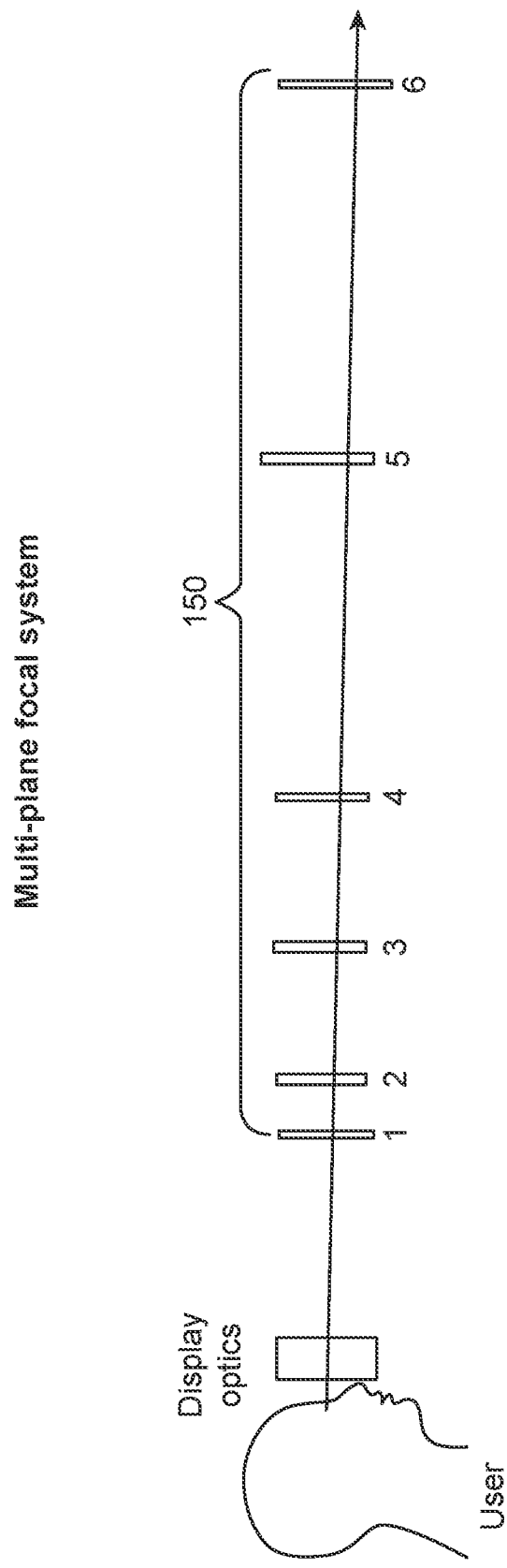
FIG. 1B illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 1B, it should be appreciated that multiple-plane focus systems may display frames at fixed depth planes 150 (e.g., the six depth planes 150 shown in FIG. 1B). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 1B. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 1 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 1B) may be utilized. Then an image of a closer tree branch may be injected at time 2 and an LOE configured to create an image appearing to originate from a depth plane 10 meters away (e.g., depth plane 5 from FIG. 1B) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 1 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

In some cases, in order to localize a user of a head-worn image display device with respect to the user's environment, a localization map of the environment is obtained. In some embodiments, the localization map may be stored in a non-transitory medium that is a part of the system 1. In other embodiments, the localization map may be received wirelessly from a database. After the localization map is obtained, real-time input image from the camera system of the image display device is then matched against the localization map to localize the user. For example corner features of the input image may be detected from the input image, and match against corner features of the localization map. In some embodiments, in order to obtain a set of corners as features from an image for use in localization, the image may first need to go through corner detection to obtain an initial set of detected corners. The initial set of detected corners is then further processed, e.g., go through non-maxima suppression, spatial binning, etc., in order to obtain a final set of detected corners for localization purposes. In some cases, filtering may be performed to identify a subset of detected corners in the initial set to obtain the final set of corners.

Also, in some embodiments, a localization map of the environment may be created by the user directing the image display device 2 at different directions (e.g., by turning his/her head while wearing the image display device 2). As the image display device 2 is pointed to different spaces in the environment, the sensor(s) on the image display device 2 senses characteristics of the environment, which characteristics may then be used by the system 1 to create a localization map. In one implementation, the sensor(s) may include one or more cameras and/or one or more depth sensors. The camera(s) provide camera images, which are processed by the apparatus 7 to identify different objects in the environment. Additionally or alternatively, the depth sensor(s) provide depth information, which are processed by the apparatus to determine different surfaces of objects in the environment.

Figure 2:
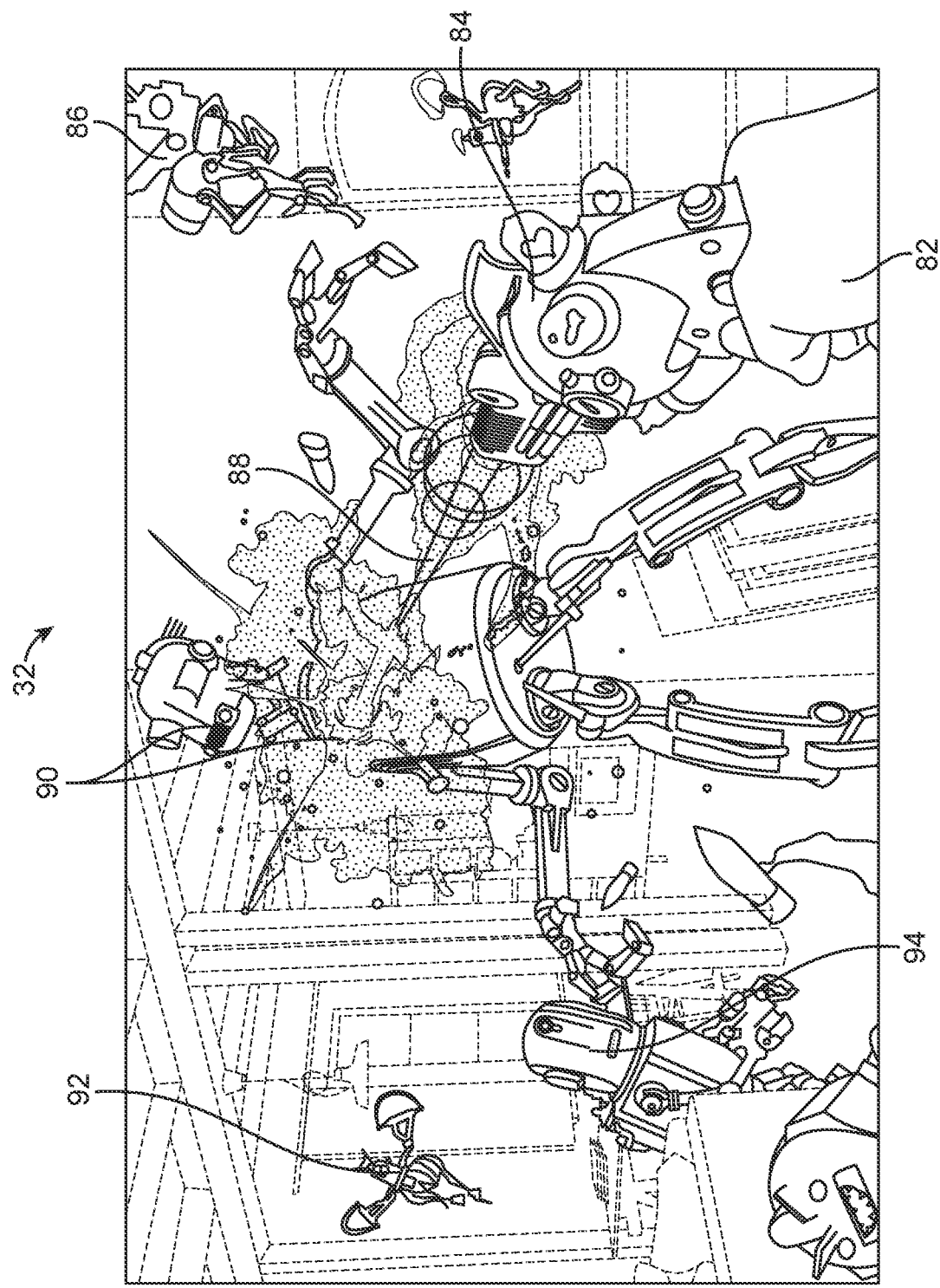
FIG. 2 illustrates an example of a view as seen through a screen of the image display device of FIG. 1A.

Referring to FIG. 2, a view 32 as seen by a user through a system such as that shown in FIG. 1A is illustrated, depicting an augmented reality gaming scenario wherein the user not only sees aspects of the room around the user, but also visualizes virtual assets that appear to be present in the room, such as flying robots 92, 86 and ambulating robots 94, 90, which may be configured to move toward the user as the user tries to shoot 88 them using an input device 84 (in the shape of a toy gun) that may be held and controlled by the hand 82 of the user. Such a game is available under the tradename "Dr. Grordbort's Invaders"™ from Magic Leap®, Inc. With such a configuration, the hand controller 82, while having a different outer shape, may feature similar components as the hand-held controller 4 component of the system of FIG. 1A, such that it may be tracked in space by the spatial computing system in multiple degrees of freedom. For example, in various embodiments the hand-held controller 4 may be tracked in six degrees of freedom, such as X, Y, Z position and yaw, pitch, roll orientation, in real or near-real time relative to other components and/or a coordinate system. Thus the configuration of FIG. 2 allows for the user to aim the hand-held controller component 84 to execute shooting toward the virtual objects 90, as shown in FIG. 2.

Referring to FIGS. 3A-9B, in other embodiments, a hand-held controller component 4, 84 may be utilized to navigate a virtual asset, such as a spaceship, in space around the user. FIGS. 3A-3I, 4A-4D, 5A-5E, and 8A illustrate views (34, 36, 38, 40, 42, 44, 46, 48, 50, 52, 54, 56, 58, 60, 62, 64, 66, 68, 69) as seen by a user through a system such as that shown in FIG. 1A, wherein a user sees aspects of the room around the user, such as a couch 102, a chair 104, and a carpeted floor 100, while the user also visualizes virtual elements such as a spaceship 96, a launching/landing pad 98, one or more asteroid, or "Gubbin", elements 112, 113, a spaceship rocket thrust visualization 110, various aspects of explosive visualization 118, 120, and various aspects of heat/burn visualization (114, 116, 118, 120, 122, 124 which may be overlaid upon actual elements of the room, such as a couch 102, chair 104, or carpeted floor 100, to provide the user with the simulated experience that the user is navigating the spaceship 96 around the room, such as by using motions of a hand-held control component 4, 84 in space, and that exposure of actual and/or virtual elements to the thrust output of the spaceship 96 can result in thermodynamic impacts to such actual and/or virtual elements, including but not limited to visualized heating, burning, and heat scarring, which may be configured to change with time, to simulate, for example, thermodynamic cooling after a heating by the spaceship thrust output. The spaceship 96 may also be termed a "rocketship".

Figure 3D:
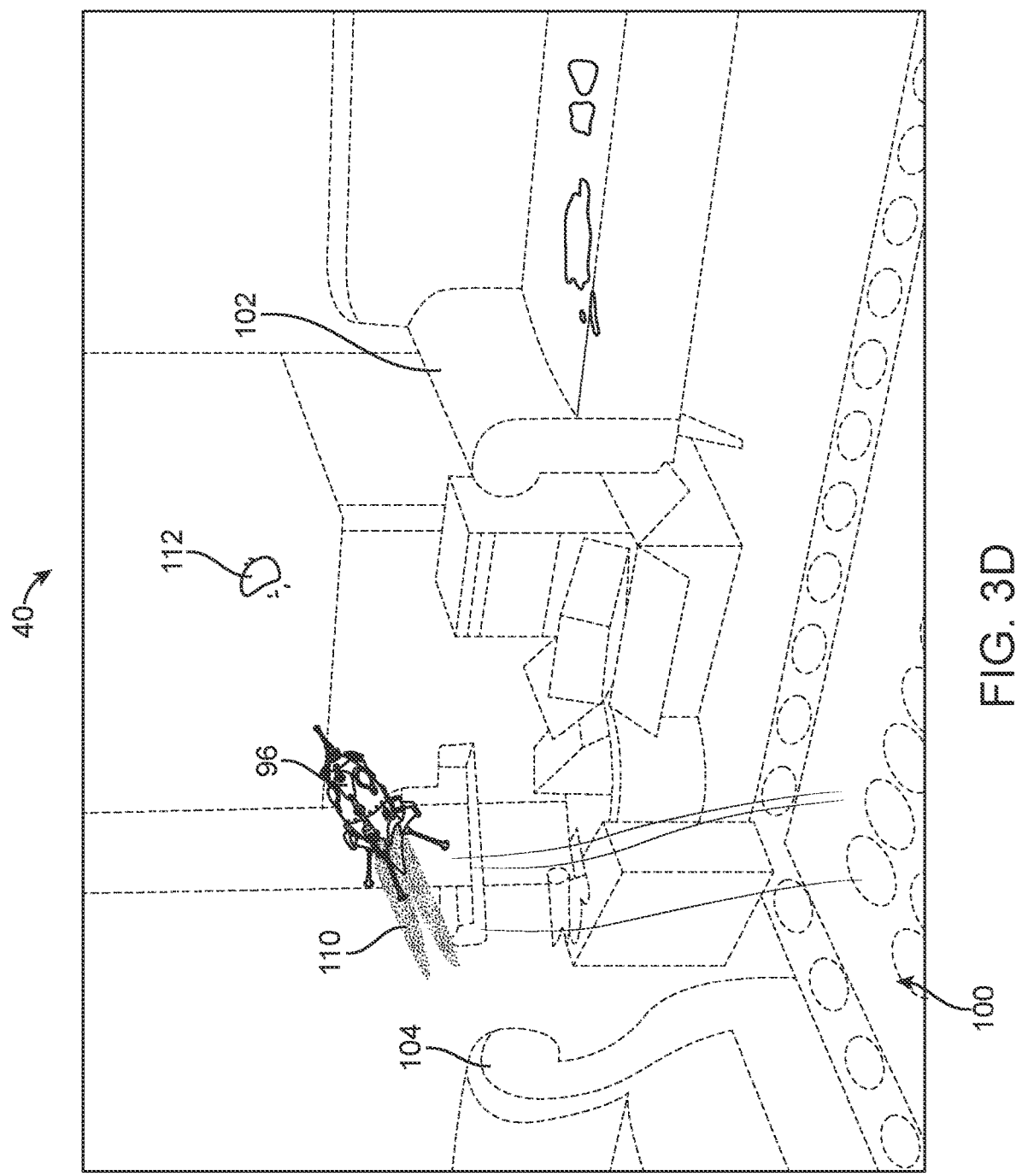
Figure 3E:
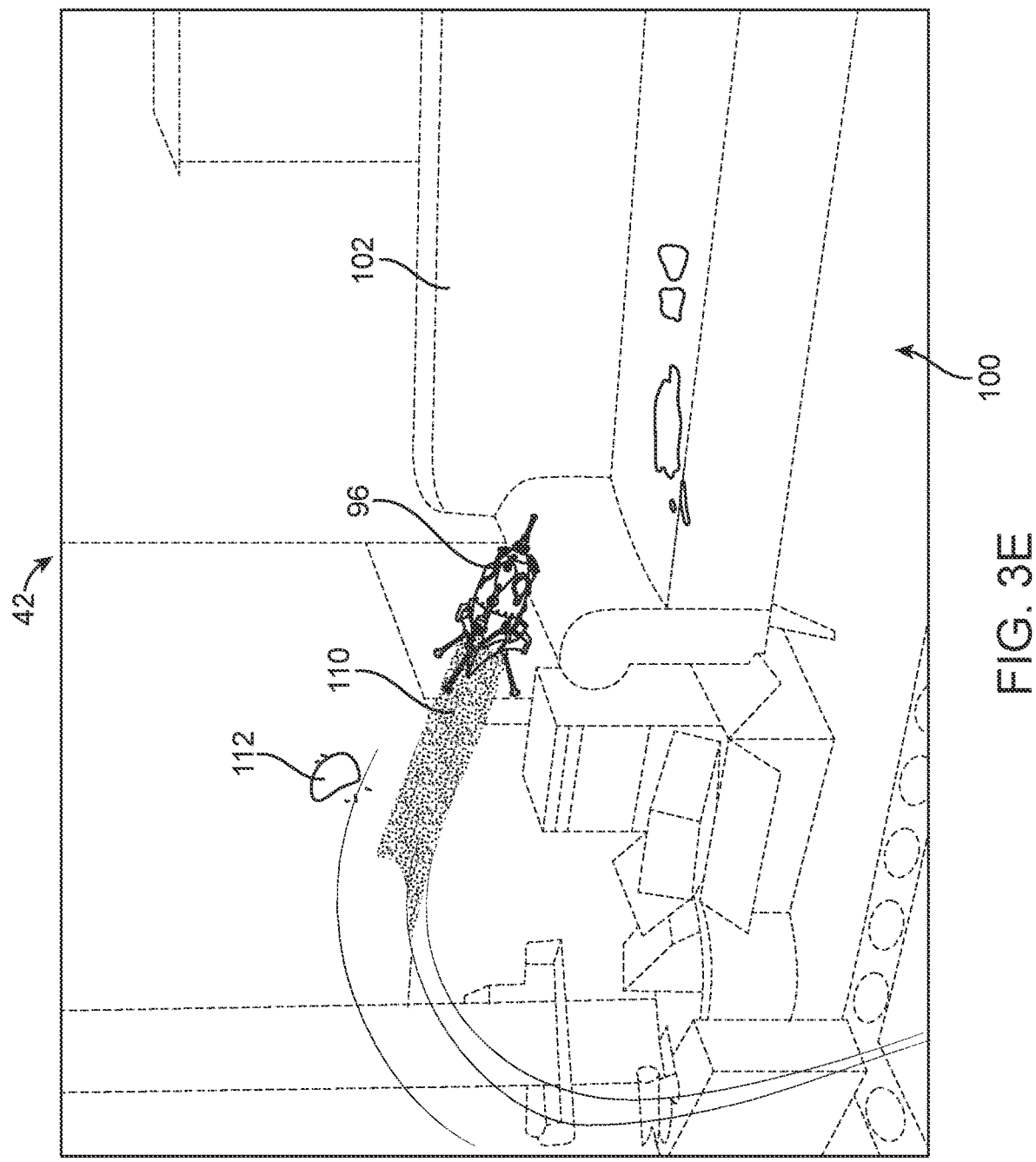
Figure 6:
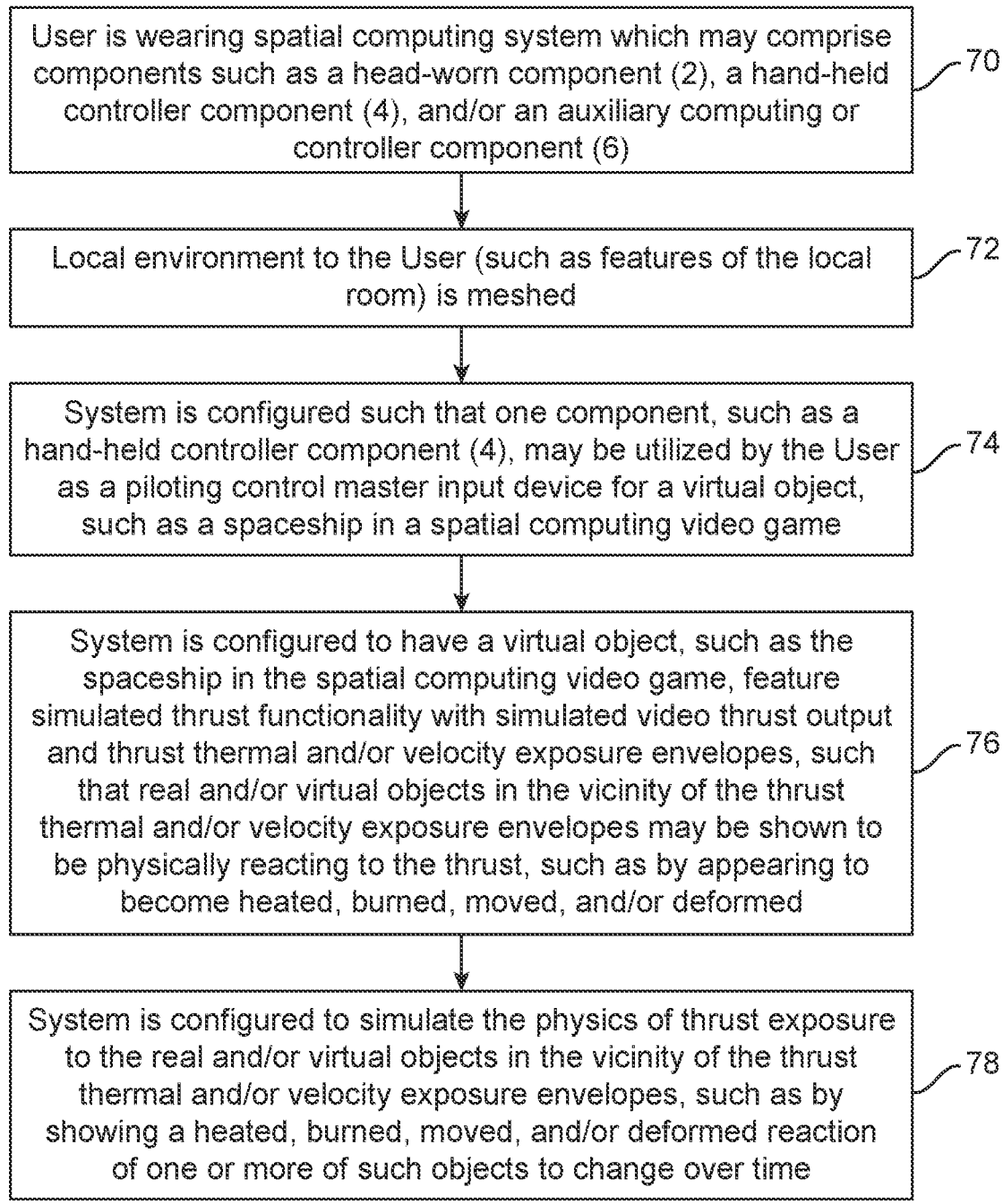
FIG. 6 illustrates a flowchart in accordance with some embodiments.
Figure 7:
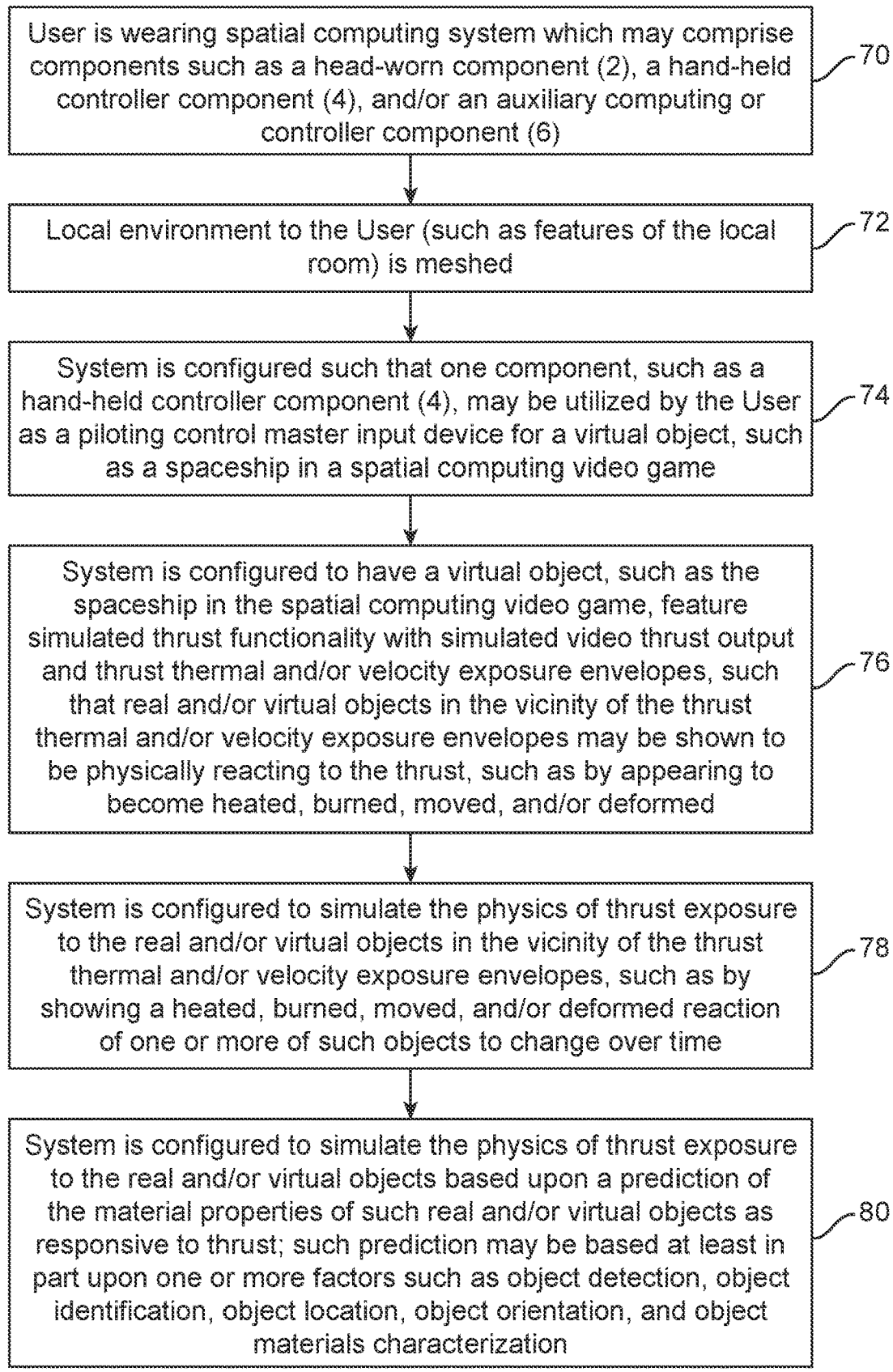
FIG. 7 illustrates another flowchart in accordance with some embodiments.
Figure 8A:
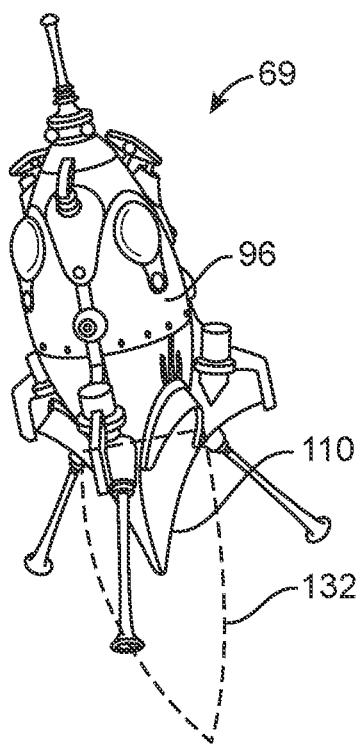
FIG. 8A illustrates an example of a graphical object having a trust element.
Figure 8B:
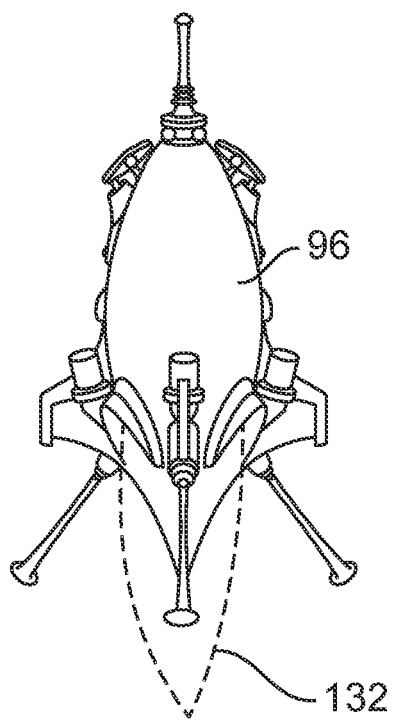
FIG. 8B illustrates another example of a graphical object having a thrust element.

Referring to FIG. 3A, the room of the user is viewed with a chair 104, floor 100, couch 102, and virtual launching/landing pad 98 with virtual spaceship 96 element positioned thereupon. In one embodiment, a hand-held controller component 4 may be configured to have a trigger element to allow for thrust control, while repositioning and reorienting the hand-held controller component 4 in space relative to a coordinate system of, for example, the room, may be utilized by the user to provide navigational inputs (such as instructions to change or retain position or orientation) as the trigger provides thrust control to work against variations of gravity, inertia, friction, or other environmental variables may be present in the simulated environment. FIG. 3A illustrates a scenario wherein the user is not commanding thrust, so that there is no 106 visible thrust visualization. Referring to FIG. 3B, with a thrust command from the user, an initial "light-up" thrust visualization 108 is shown, and referring to FIG. 3C, as the spaceship launches up, the thrust visualization is shown, such as by an orange (when in color) tapering glow extending from the spaceship 96. Referring to FIGS. 3D and 3E, with further thrust commanded by the user, and movement and/or reorientation of the hand-held controller component 4 relative to the room, the spaceship 96 may be navigated about the room and visualized relative to the room by the user. Referring ahead to FIG. 6 and FIG. 7, prerequisite to having the spaceship and any other virtual elements being relationally positioned/repositioned and oriented/reoriented relative to actual elements of the room, such as the floor 100, a couch 102, and/or a chair 104, the local environment (such as the room around the user) may be "meshed" or mapped, such as by the use of depth and/or optical camera analysis of the features around the user as the user orients his or her head around the room while wearing the spatial computing system (i.e., such as that shown in FIG. 1).

Figure 3G:
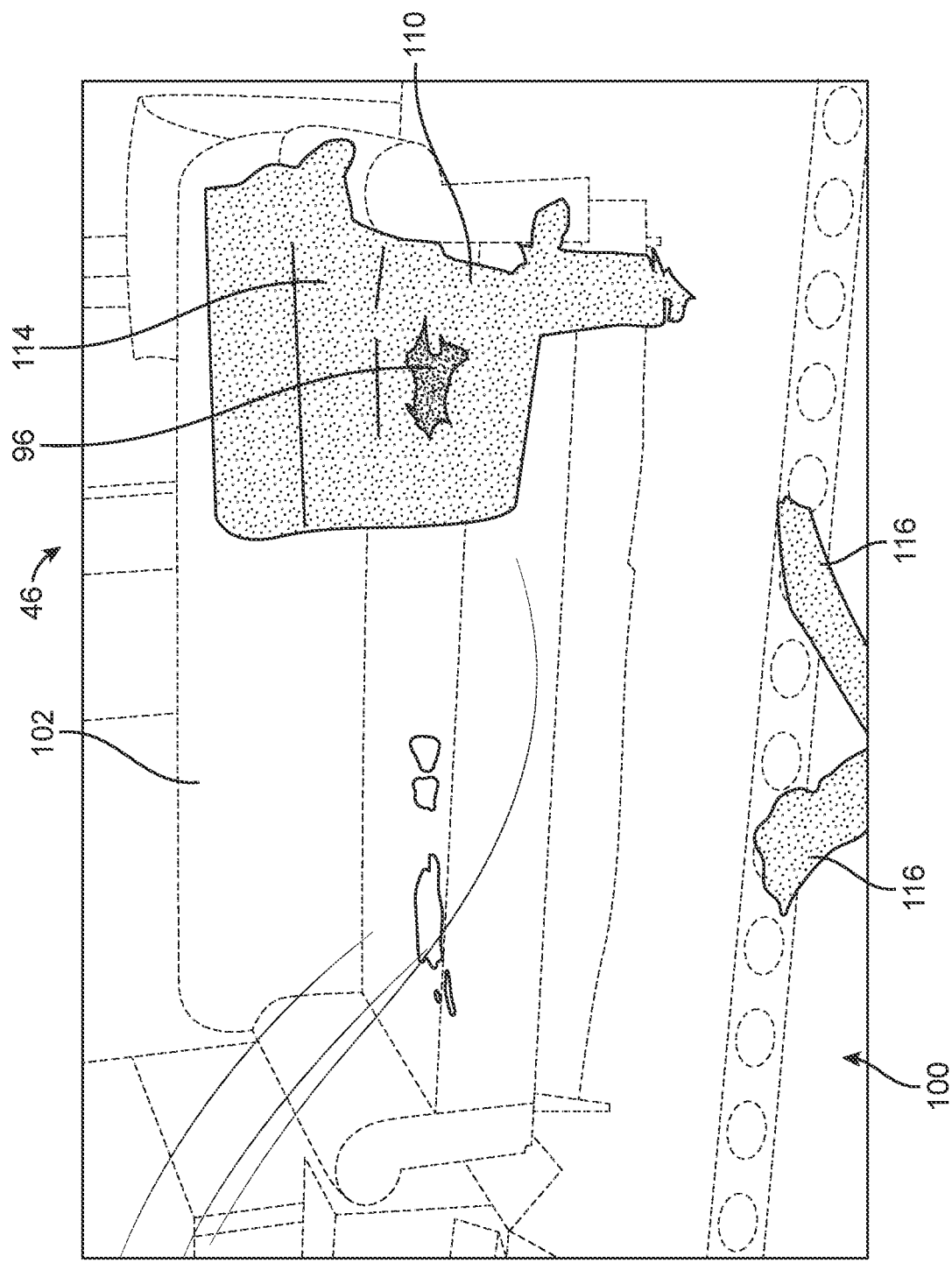
Figure 3H:
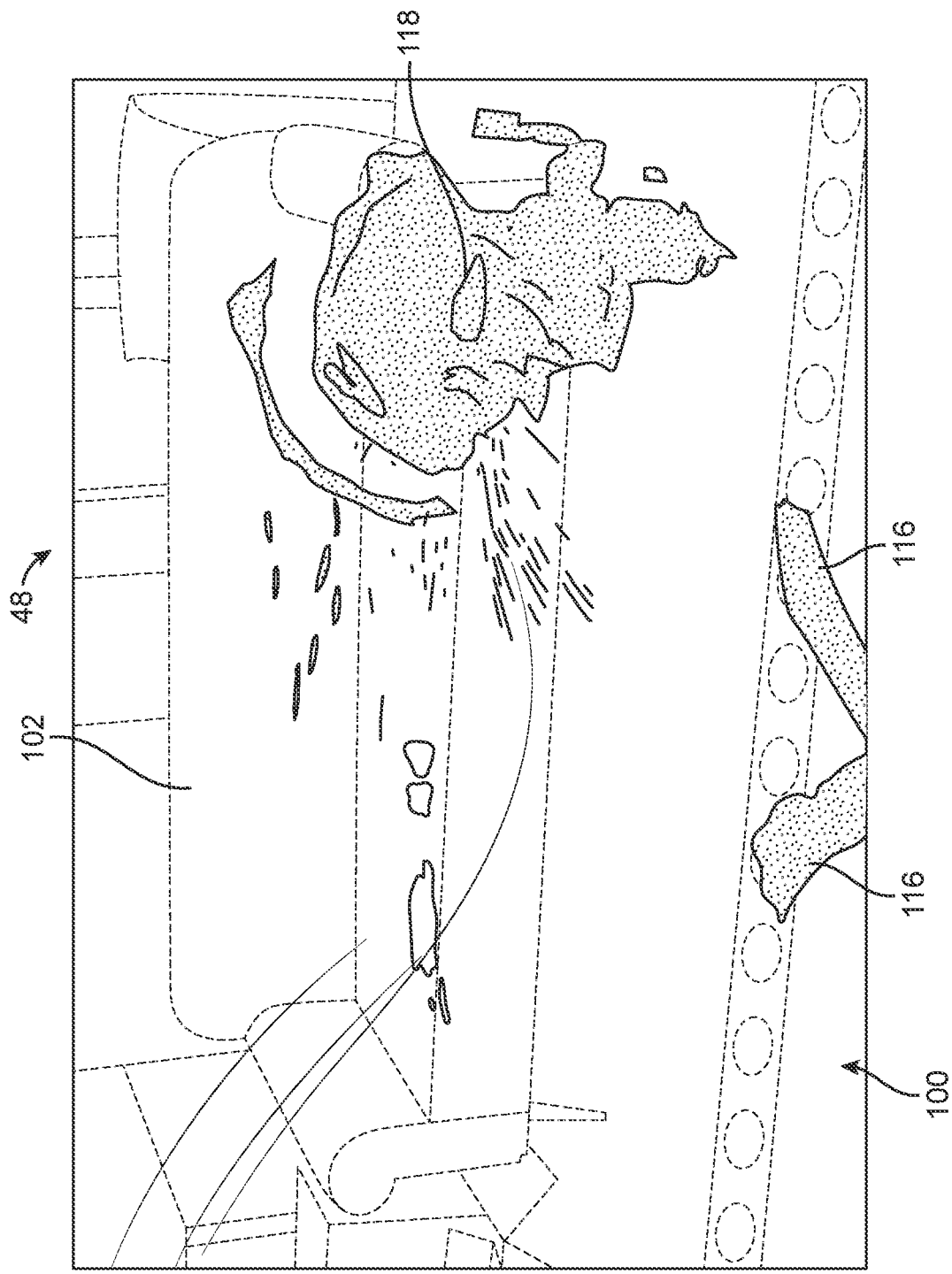
Figure 3I:
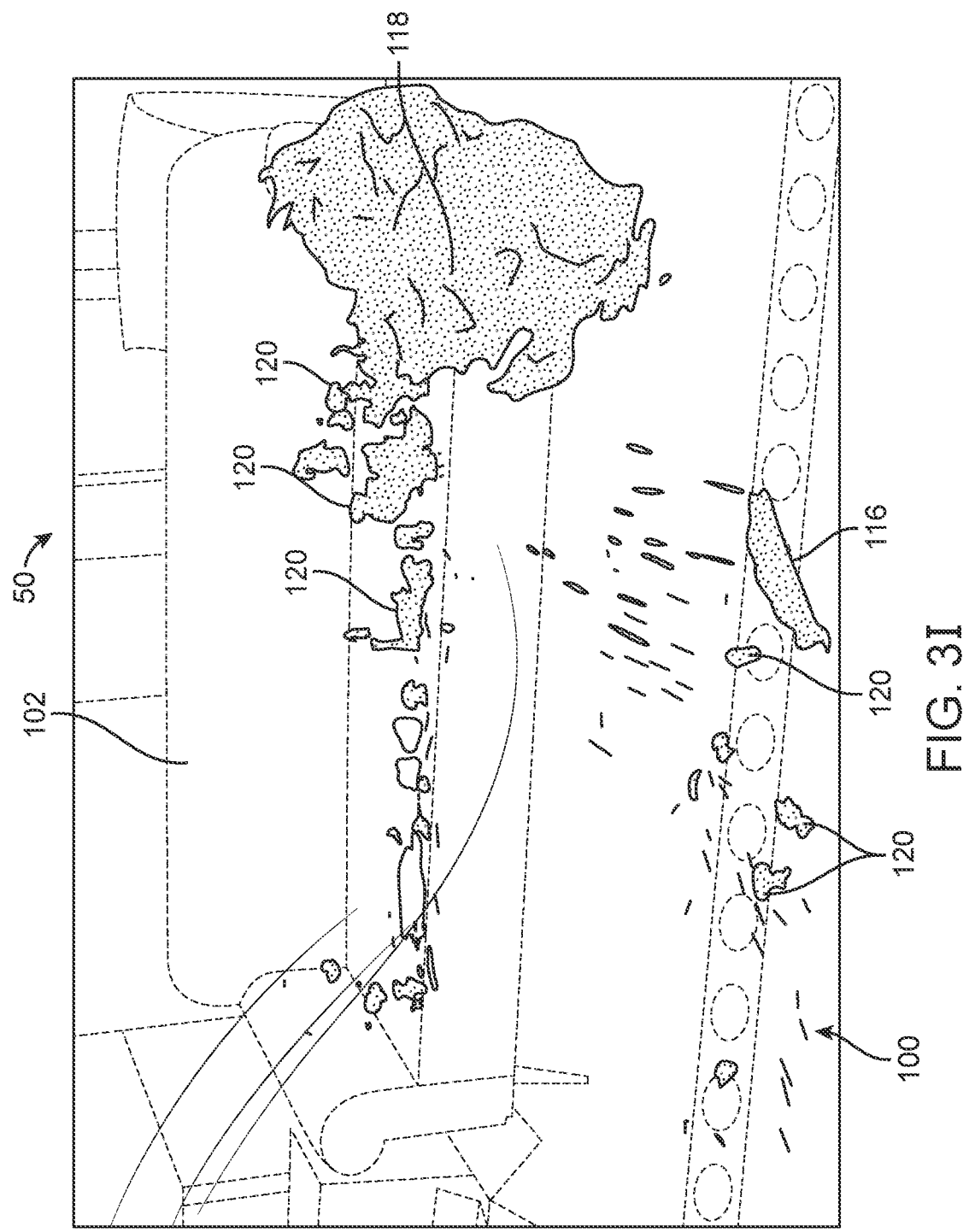
Figure 4A:
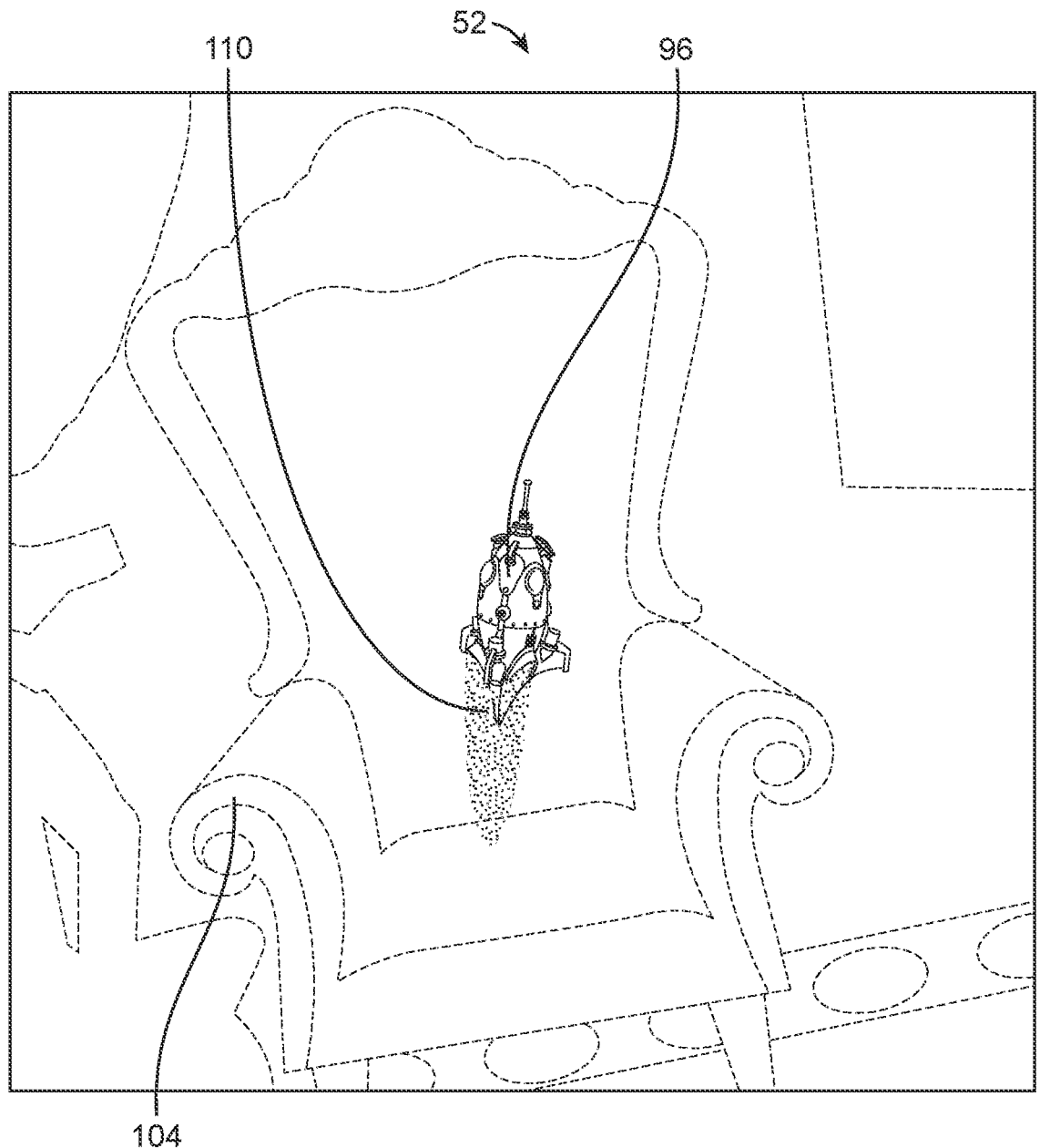
FIGS. 4A-4D illustrates examples of different views as seen through a screen of the image display device of FIG. 1A.
Figure 4B:
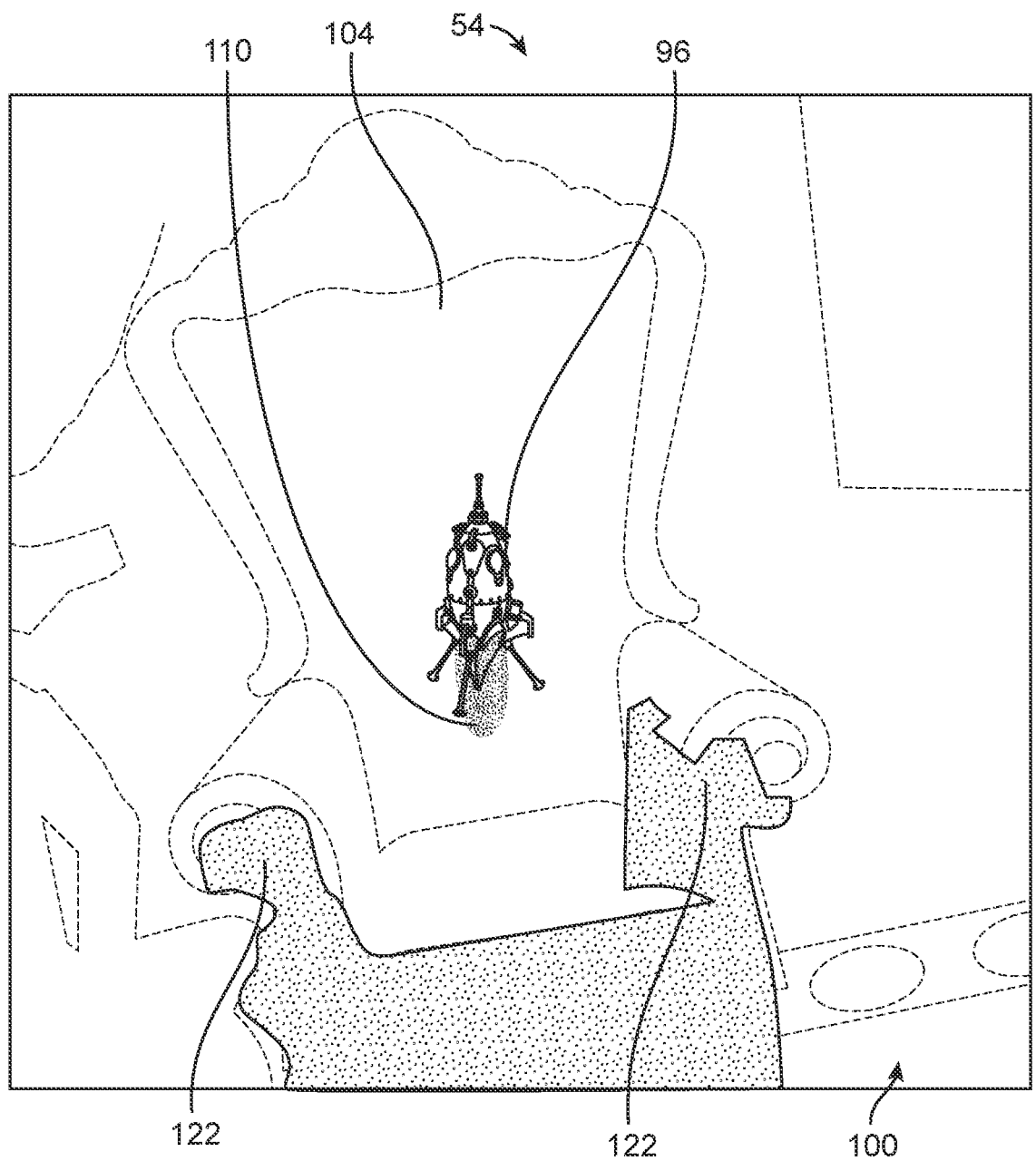
Figure 4C:
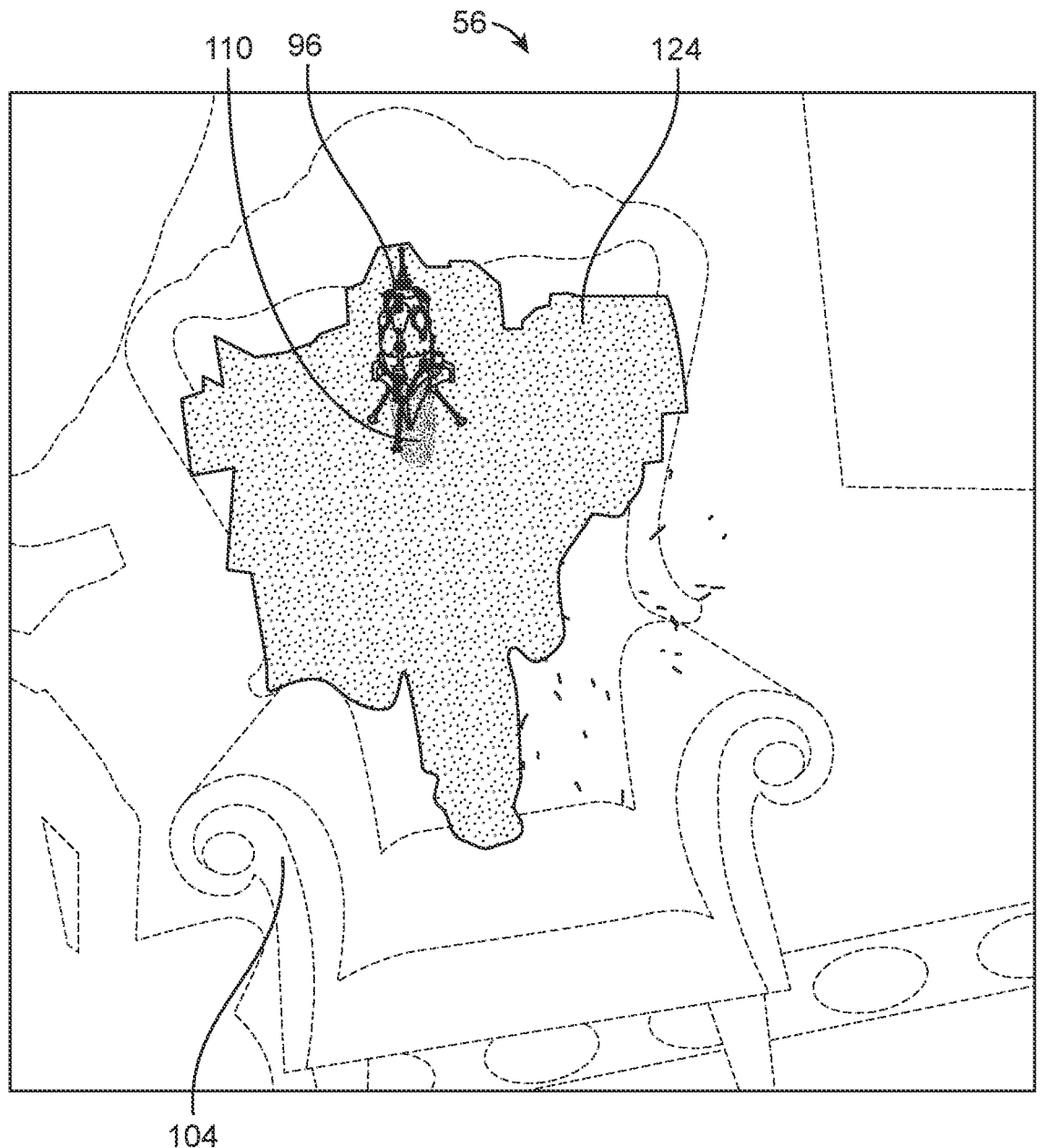
Figure 4D:
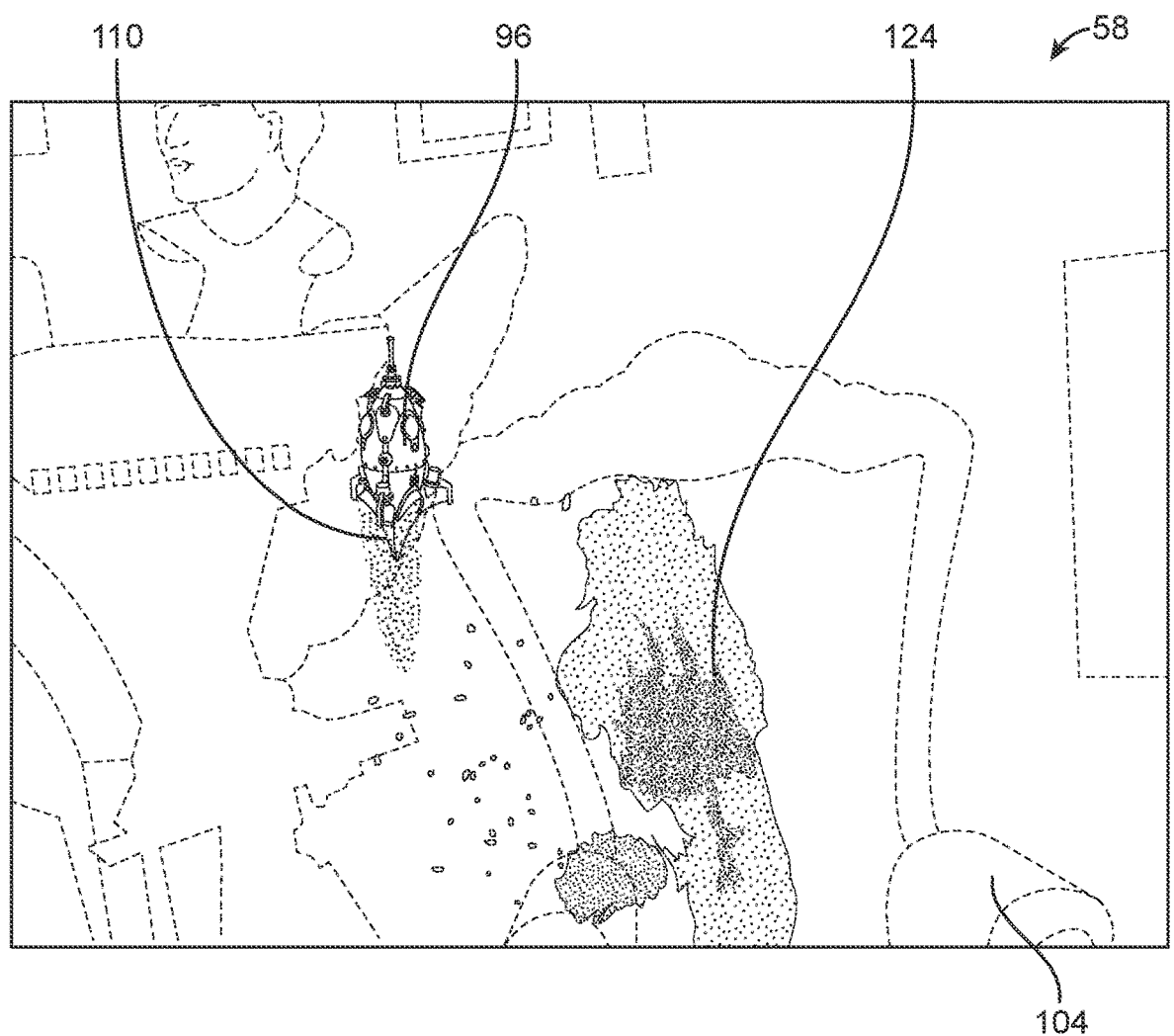
Figure 5A:
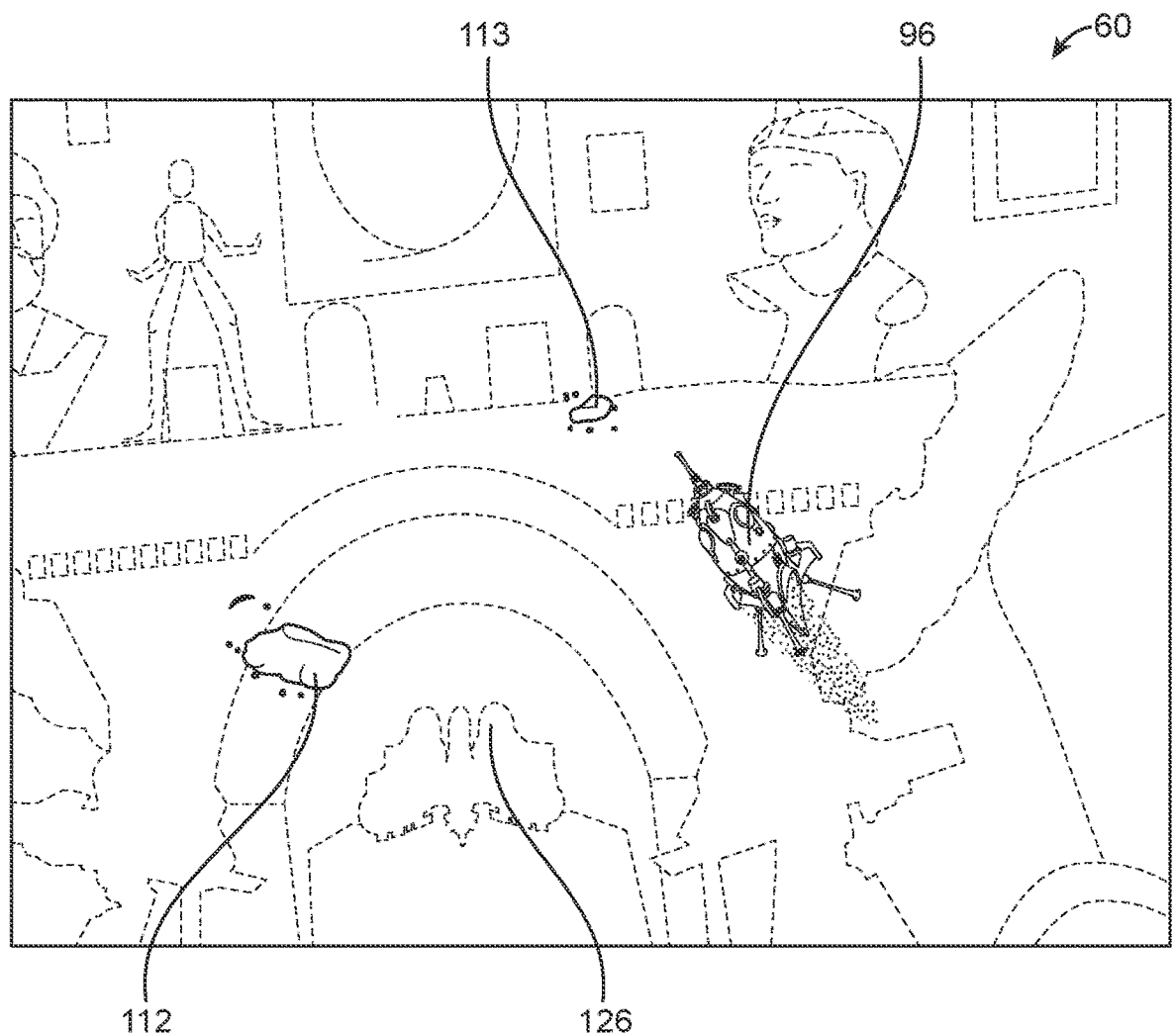
FIGS. 5A-5E illustrates examples of different views as seen through a screen of the image display device of FIG. 1A.
Figure 5B:
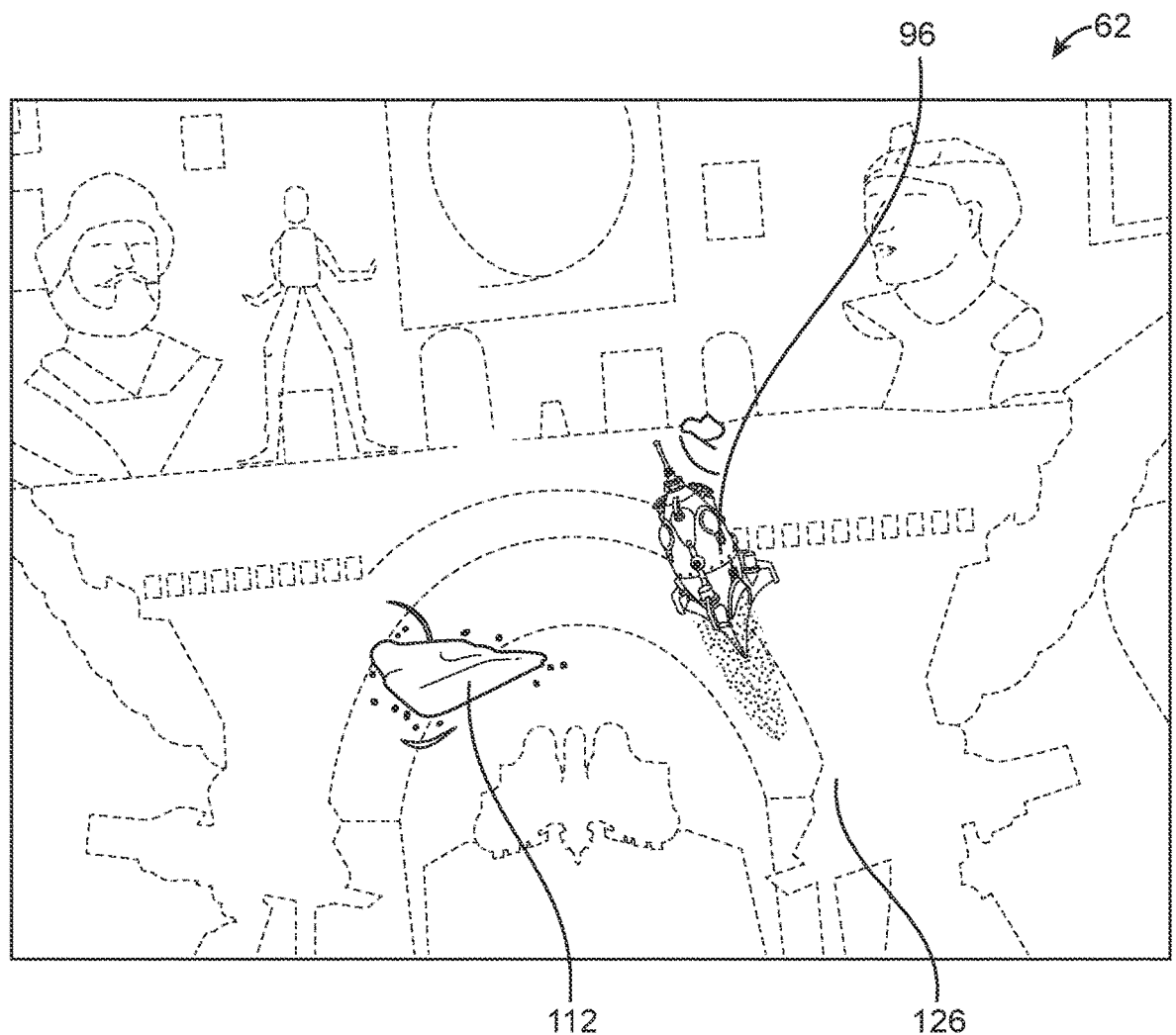
Figure 5C:
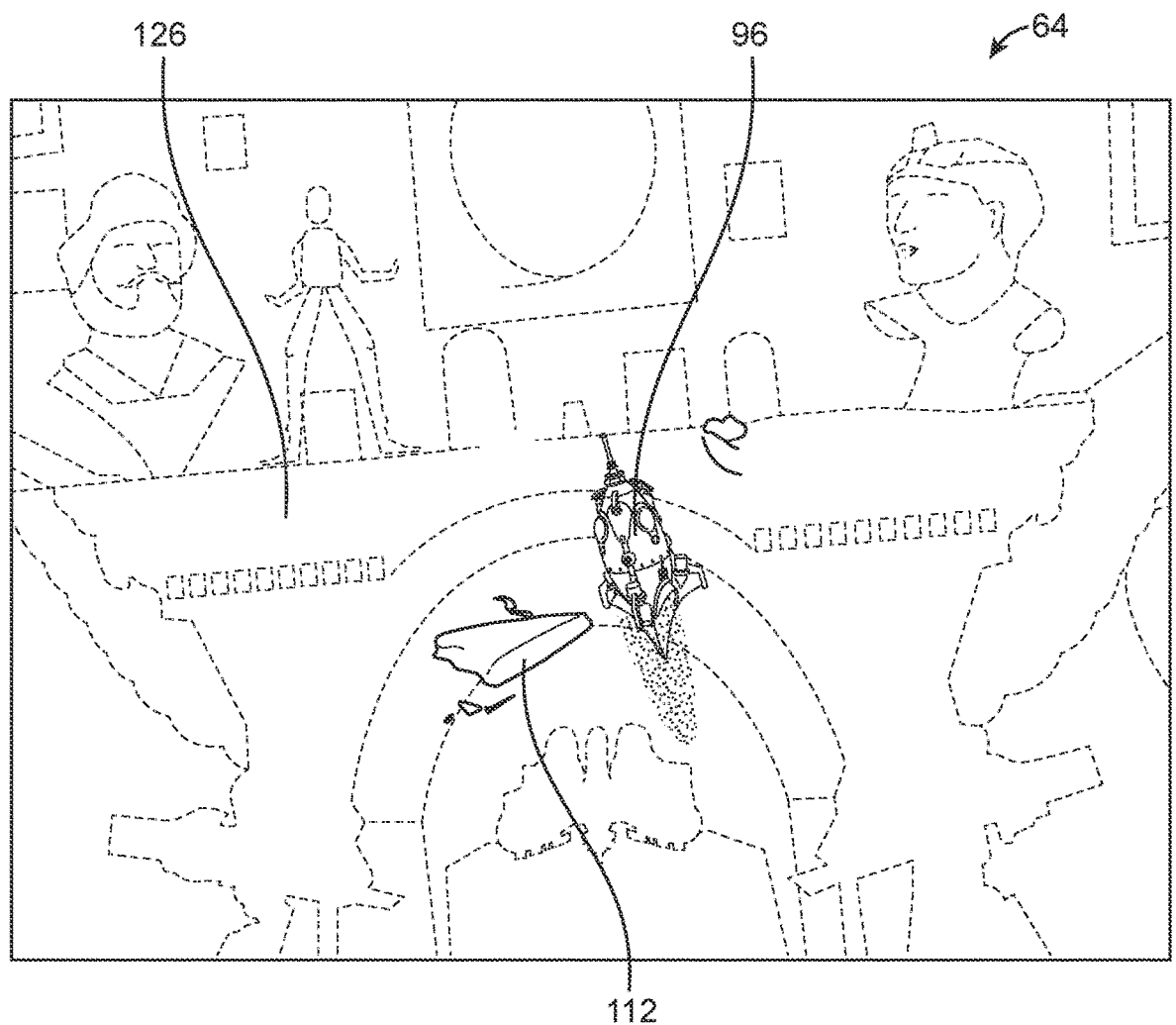
Figure 5D:
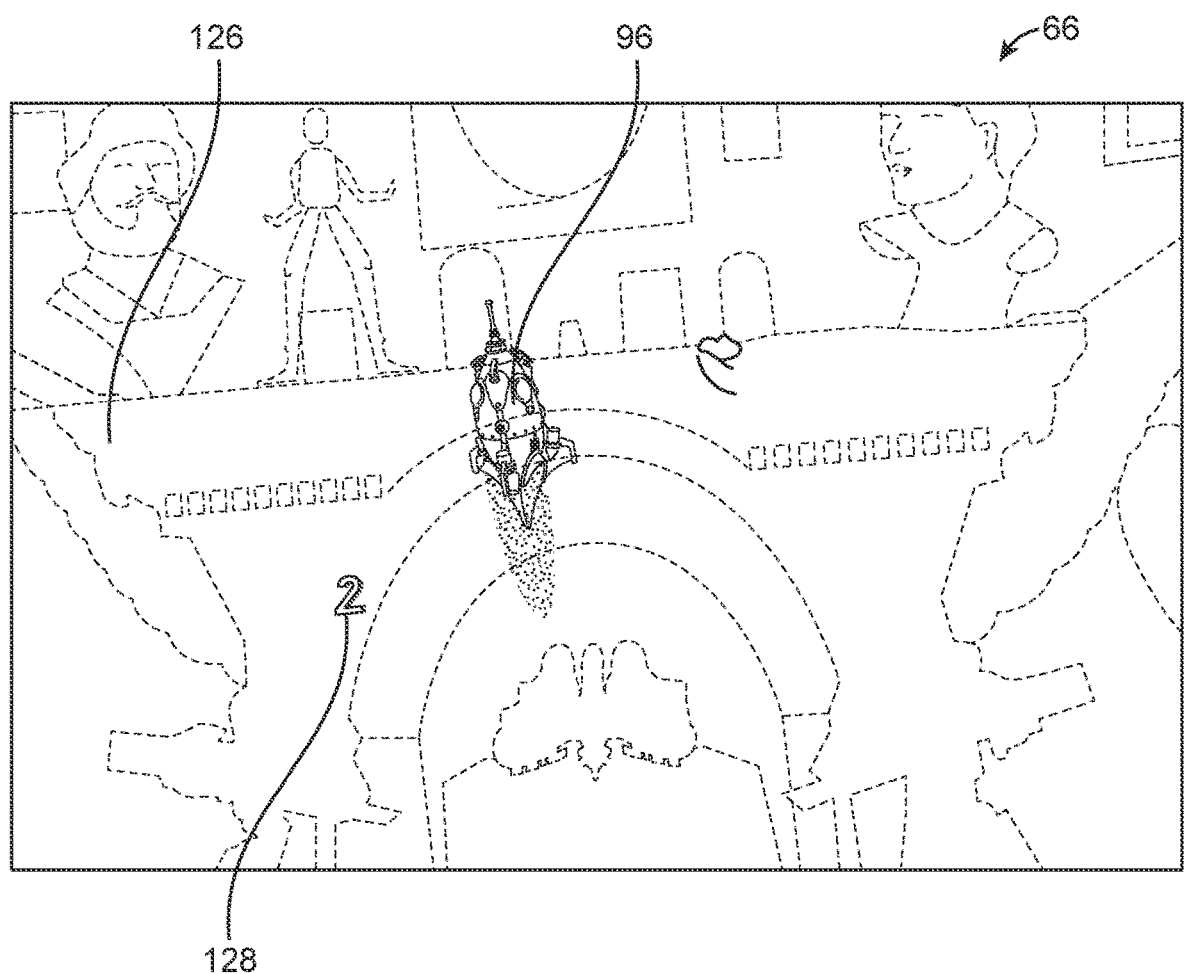
Figure 5E:
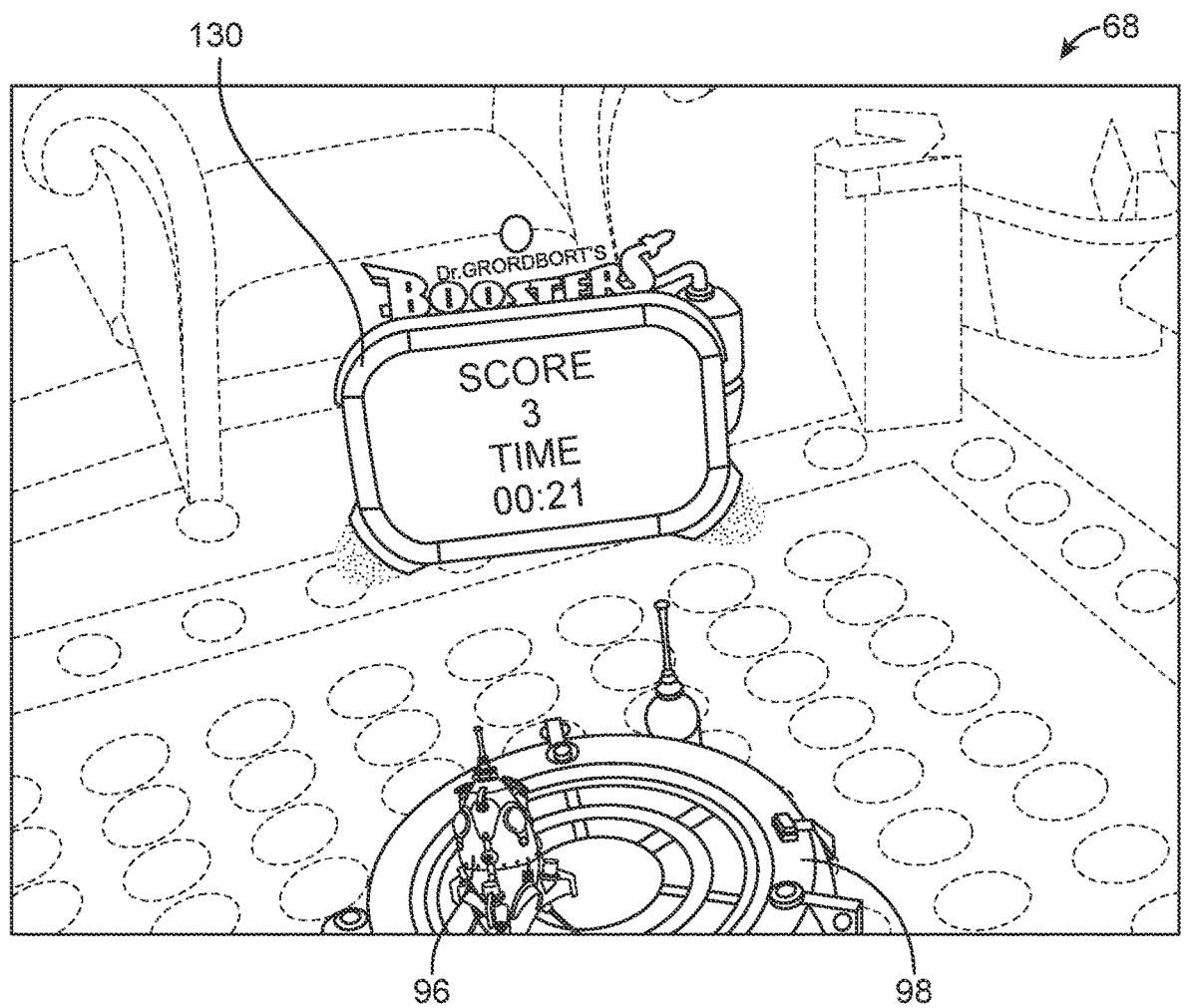

Thus referring to FIG. 3F, as the user navigates the virtual spaceship 96 toward the actual couch 102 and actual floor 100 of the room, the spatial computing system may be detect such proximity, and elements close to the thrust output visualization 110 may be depicted as becoming heated, burned, and/or heat scarred, as shown in FIG. 3F wherein heating, burning, and/or heat scarring may be shown 114, 116 with alternative color visualization, such as variations or orange and/or red when in color. Referring to FIG. 3G, when the virtual spaceship is navigated so that it drifts toward a collision with the actual couch 102, a visualization of heating, burning, and/or heat scarring 114, 116 may be shown, and upon collision, as shown in FIGS. 3H-3I, the spaceship may be visualized to turn to a heated explosion 118 which may also be shown to create thermodynamic impacts 118, 120 for the local environment.

Similarly, referring to FIGS. 4A-4D, a virtual spaceship 96 is shown visualized to the user navigating a meshed room near a chair 104, and when the spaceship turns adjacent to the chair with the thrusters activated, the chair is shown to have visible thermodynamic impacts 122, 124, such as by heating, burning, and/or heat scarring which may be modulated with time. For example, the heating impacts may be visualized to effectively be "cooling off" with time as the exposure to the thrusters is discontinued, by successively less visible virtual heat signature. In other words, if an element such as a chair is freshly heated, it may be shown to have bright red or orange heat visualization; with time and discontinued exposure to the thruster heat source, it may be shown to have less bright red or orange visualization, and this may continue to decrease over time. In one variation, with sufficient cooling the heat visualization may entirely be discontinued; in another variation, remaining damage (such as in an actual burned but cooled off scenario, for example with gray colored remnant materials when in color) may remain visualized.

In various embodiments, simulated thermodynamic physics may be imparted to various elements which may be heated, burned, and/or heat scarred. For example, certain materials may be simulated to have greater thermal inertia (i.e., they require more heat input to gain temperature, and cool down over longer periods of time), or may be more susceptible to burning or heat scarring, for example. In one embodiment, the spatial computing system may be configured to identify certain objects, such as by computer vision/matching/identification techniques. In another embodiment, the spatial computing system may be configured to utilize depth and/or picture cameras to detect surface profiles or microprofiles that may be associated with thermal and burning material properties. In another embodiment, ray casting techniques, such as sweeping, oscillating, spiral pattern, figure-8 pattern, or other pattern one or more rays to detect adjacent surface positions of a particular element, may be utilized to detect surface profiles and microprofiles that may be associated with thermal and burning material properties. In other embodiments, two or more of the above techniques may be utilized together with hybridized analysis to assist in predicting thermal and/or burning material properties pertinent to a particular object.

For example, in one variation, ray casting techniques utilizing rays originating, for example, from a head-wearable component 2 or hand-held component 4 and terminating at the surface of a viewed or selected element may be utilized along with computer vision/matching/identification techniques to identify that an actual couch element in the room is likely to be an Ikea® "Model 55" sofa, which is likely to comprise flammable pine wood arms and a flammable cotton seating surface, with confirmation from the ray tracing sweeping to indicate that the arms appear to be planar and hardened relative to the highly textured and likely rumpled seating surface. When an active spaceship thruster, say on full throttle, is passed nearby, the system may be configured to heat, burn, and/or scar the couch as though the arms are made of pine wood and the seating surface is made of flammable cotton.

Referring to FIGS. 5A-5E, one or more asteroid 112, 113 or other virtual elements may be present and visualized by the user, and the user may be rewarded in game-style fashion by capturing or coming into close enough three-dimensional spatial proximity to such elements 112, 113. In one embodiment, as shown in the depicted variation of FIGS. 5A-5E adjacent a fireplace 126 in a user's room, as the spaceship 96 is navigated close enough to an asteroid element 112, 113, the nearby asteroid element 112 becomes pulled or attracted to the spaceship and disappears, followed by a visualization of an incremental score (i.e., 1 more point; 128). At the end of the game, upon landing of the spaceship 96 on the landing pad 98, the final score may be visualized 130 for the user.

Figure 9A:
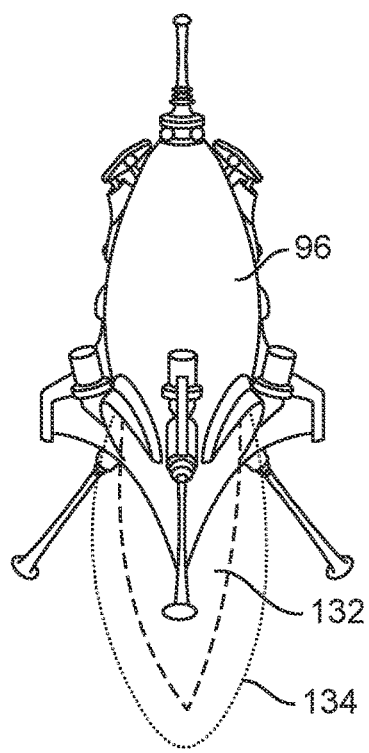
FIG. 9A illustrates the graphical object of FIG. 8B, particularly showing the thrust element having two different configurations.
Figure 9B:
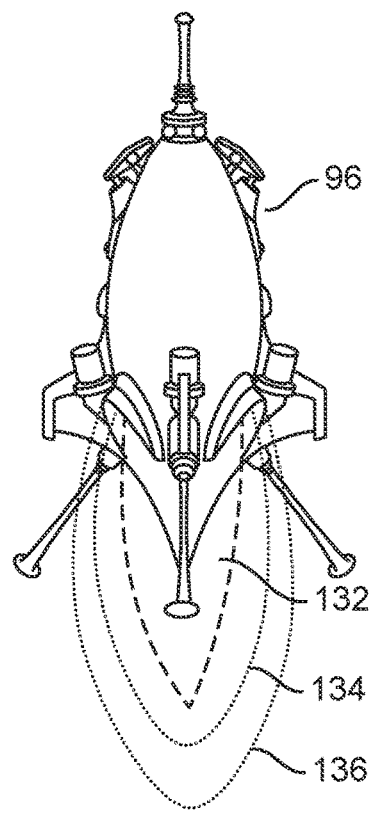
FIG. 9B illustrates the graphical object of FIG. 8B, particularly showing the thrust element having three different configurations.

Referring to FIG. 6, a flowchart illustrates various such aspects. A user may be wearing spatial computing system which may comprise components such as a head-worn component 2, a hand-held controller component 4, and/or an auxiliary computing or controller component 6, 70. The local environment to the User (such as features of the local room) may be meshed such that the user's spatial computing system has a map of the geometry of the room around the user and elements therein 72. The system may be configured such that one component, such as a hand-held controller component 4, may be utilized by the User as a piloting control master input device for a virtual object, such as a spaceship in a spatial computing video game 74. The system may be configured to have a virtual object, such as the spaceship in the spatial computing video game, feature simulated thrust functionality with simulated video thrust output (output visualization 110; element 132 in FIGS. 8A, 8B, 9A, and 9B represents the "envelope" or outer bounds, or the thrust output visualization) and thrust thermal and/or velocity exposure envelopes (elements 134 and 136 of FIGS. 9A and 9B represent successive envelopes; proximity of an object to the outer envelope 136 may be utilized by the system to simulate heat exposure at a first level, while proximity of an object to the inner envelope 134 may be utilized by the system to simulate heat exposure at a first level; in other words, in one variation, if a couch element intersects the outer envelope 136 it may be simulated to start to burn at a first level or rate; if it intersects the inner envelope 134, it may be simulated to burn at a second level or rate that is more accelerated or hotter than the first level or rate), such that real and/or virtual objects in the vicinity of the thrust thermal and/or velocity exposure envelopes may be shown to be physically reacting to the thrust, such as by appearing to become heated, burned, moved, and/or deformed 76. The system may be configured to simulate the physics of thrust exposure to the real and/or virtual objects in the vicinity of the thrust thermal and/or velocity exposure envelopes, such as by showing a heated, burned, moved, and/or deformed reaction of one or more of such objects to change over time 78.

Referring to FIG. 7, another embodiment similar to that of FIG. 6 is illustrated, with the additional element, such as is discussed above in reference to FIGS. 5A-5E that the system may be configured to simulate the physics of thrust exposure to the real and/or virtual objects based upon a prediction of the material properties of such real and/or virtual objects as responsive to thrust; such prediction may be based at least in part upon one or more factors such as object detection, object identification, object location, object orientation, and object materials characterization 80.

Thus in a gaming instantiation configuration, when the game, which may be termed "Dr. Grordbort's Boosters"™, is started using a spatial computing system such as that illustrated in FIG. 1, sensors (such as 22, 24, 26, 28) on the head-wearable component 2 may be utilized to "mesh" (i.e., to create a model of the geometry of the room and aspects/features thereof, such as a triangular mesh), or create or update a mesh, of the room around the user. In one embodiment the system may be configured to be continuously scanning so that a user may navigate a room, move about into different areas of the room or another room, and continue to operate the game. In one embodiment, the user/player may add a meshing volume using the system interface, scaled this meshing volume up to a size large enough to capture the intended gaming environment, and execute a script to follow the player around this environment with updated meshing analysis and determination. The launch/landing pad 98 may be placed by the user, or may be placed automatically by the system as it identifies a suitable location, such as a substantially planar floor 100 surface with an open area or region. As discussed above, with the spaceship 96 ready to launch from the launch/landing pad 98, the player/user may navigate or direct/redirect the spaceship 96 using a hand-held control module 4, and as noted above, the system may be configured such that angle that the control module 4 is twisted (or reoriented) to, and/or flexed (or repositioned or redirected) to, changes the orientation and direction of the spaceship 96. The system may be configured such that pulling a trigger on the hand-held control module 4 increases the thrust from 0% to 100% along a curve, with a small flattening of the curve near the midpoint to create a neutral buoyancy zone where the player can find a spot that allows them to hover the spaceship 96 within the room. In one embodiment thrust exits from the bottom of the spaceship 96. In various embodiments, small re-orienting or maneuvering thruster jets may be positioned at other locations of the spaceship 96, such as at the nose or top tip of the spaceship 96. The system may be configured such that when the user/player gazes through the head-wearable component 2 at the hand-held component 4, small visible virtual guides appear (and in one variation a glowing outline around the hand-held controller 4 to indicate that the system has determined that the user is gazing at the hand-held controller 4 and may wish to have further information or instruction), such as textual tool-tips, to assist the user/player in understanding the controls for the game, and what the various inputs do. In another embodiment wherein the hand-held controller comprises a pattern of lights, such as a circular LED halo, such lighting may be configured to always point toward the location of the virtual spaceship 96 within the room. In one embodiment, landing gear of the virtual spaceship 96, such as a plurality of elongate stand members, may be configured to deploy/extend outward relative to the main body of the spaceship 96 only when the spaceship 96 is within a certain predetermined proximity of the launching/landing base 98 and is in a landing orientation, such as an orientation that is substantially normal to the plane of the launching/landing base 98. In other embodiments, various other small components of the virtual spaceship 96 may be configured to visibly move relative to the main body of the spaceship 96 in accordance with aspects pertaining to how the spaceship 96 is being navigated or where it is located; for example, in one embodiment, the system may be configured to plant a small victory flag and sound a horn when landed on the launching/landing base 98 or any other surface of the environment, and such flag or flags may be configured to visibly flap in the "wind" (i.e., associated with downstream/redirected remnants of thrust) as the spaceship 96 takes off again with thrust—and to remain in place so that a user/player can gaze around the room and see where they have successfully landed.

In one embodiment, when the spaceship 96 is on the launch/landing pad 98 and a player moves very close with their head wearing the head-wearable component 2, such as a distance at which the system is configured to cut or clip away the virtual content (also known as a "clipping plane" of the system), the system may be configured to show the user a different view of the spaceship 96 or other virtual elements, such as a blueprint of the spaceship 96 with a character sitting inside at a pilot's seat.

In one embodiment, the system may be configured to make a loud "thonk" sound if the user navigates the spaceship 96 such that it collides with other elements, such as the user's cranium.

In one embodiment, as noted above, the system may be configured to show the spaceship 96 exploding upon certain collision conditions, such as when it collides with objects of the real or virtual world, such as when such collision happens in excess of certain predetermined speed limits or angle or impact limits. As discussed in reference to FIG. 3I, the explosion may include additional heating, burning, and virtual damage to the environment; further, particles and bits of the spaceship may be shown to litter the area, and even if the flames are shown to eventually extinguish, the system may be configured to continue showing exploded spaceship remnants and debris, somewhat akin to planted flags, so that a user may see where they've had collisions and accidents in their environment. The system may be configured to facilitate various spaceship 96 modes, such as a basic mode and an advanced mode with more thrust and higher spaceship 96 velocities. In one embodiment, different spaceship 96 sizes may also be selected, such as a size similar to that shown in FIG. 3A relative to the scale of the nearby furniture 102, 104, or a larger size, such as in one mode which may be termed an "Experimental Giant Rocket" mode, wherein the spaceship 96 may be displayed as very large relative to the scale of the room or user.

Processing Unit

Figure 10:
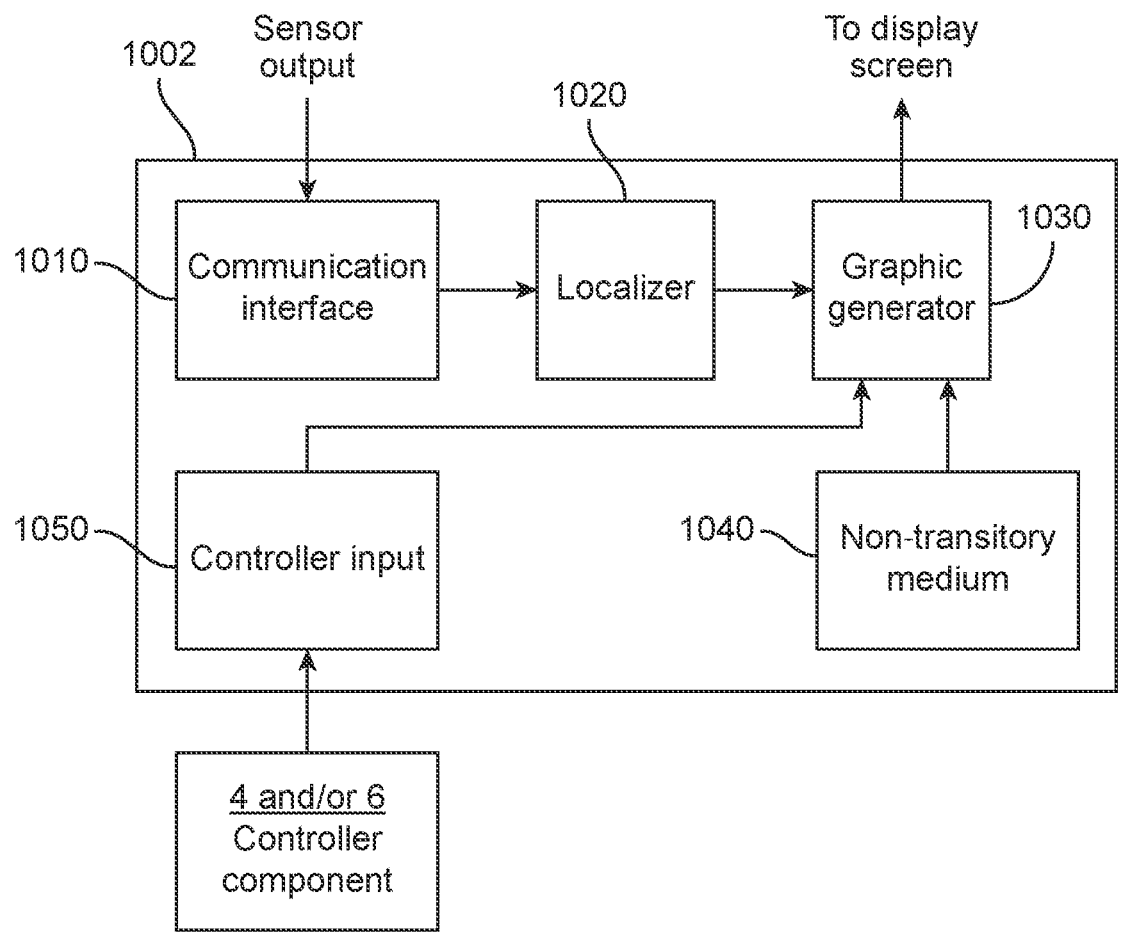
FIG. 10 illustrates a processing unit of an image display device in accordance with some embodiments.

FIG. 10 illustrates a processing unit 1102 in accordance with some embodiments. The processing unit 1102 may be an example of the apparatus 7 described herein. As shown in the figure, the processing unit 1002 includes a communication interface 1010, an object detector 1020, a graphic generator 1030, a non-transitory medium 1040, and a controller input 1050. In some embodiments, the communication interface 1010, the object detector 1020, the graphic generator 1030, the non-transitory medium 1040, the controller input 1050, or any combination of the foregoing, may be implemented using hardware. By means of non-limiting examples, the hardware may include one or more FPGA processors, one or more ASIC processors, one or more signal processors, one or more math processors, one or more integrated circuits, or any combination of the foregoing. In some embodiments, any components of the processing unit 1102 may be implemented using software.

In some embodiments, the processing unit 1002 may be implemented as separate components that are communicatively coupled together. For example, the processing unit 1002 may have a first substrate carrying the communication interface 1010, the object detector 1020, the graphic generator 1030, and the controller input 1050, and another substrate carrying the non-transitory medium 1040. As another example, all of the components of the processing unit 1002 may be carried by a same substrate. In some embodiments, any, some, or all of the components of the processing unit 1002 may be implemented at the image display device 2. In some embodiments, any, some, or all of the components of the processing unit 1002 may be implemented at a device that is away from the image display device 2, such as at the handheld control component 4, the control component 6, a cell phone, a server, etc.

The processing unit 1002 is configured to receive one or more sensor output from sensors at the image display device 2, and control the screen of the image display device 2 to display graphics based on the sensor output. In some embodiments, the sensor output may include image(s) captured by a camera at the image display device 2. Alternatively or additionally, the sensor output may include distance data captured by depth sensor(s) at the image display device 2. The distance data may be data generated based on time-of-flight technique. In such cases, a signal generator at the image display device 2 transmits a signal, and the signal reflects off from an object in an environment around the user. The reflected signal is received by a receiver at the image display device 2. Based on the time it takes for the signal to reach the object and to reflect back to the receiver, the sensor or the processing unit 1002 may then determine a distance between the object and the receiver. In other embodiments, the sensor output may include any other data that can be processed to determine a location of an object in the environment.

The communication interface 1010 is configured to receive the sensor output. In some embodiments, the communication interface 1010 is communicatively coupled to a camera and/or depth sensor(s) of the image display device 2. In such embodiments, the communication interface 1010 receives images directly from the camera, and/or depth signals from the depth sensor(s). In some embodiments, the communication interface 1010 may be coupled to another device, such as another processing unit, which processes images from a camera, and/or processes depth signals from the depth sensor(s), before passing them to the communication interface 1010. Also, in some embodiments, the communication interface 1010 may be configured to obtain the sensor output wirelessly or via physical conductive transmission line(s).

In some embodiments, if there are different sensors at the image display device 2 for providing different types of sensor outputs, the communication interface 1010 of the processing unit 1002 may have different respective sub-communication interfaces for receiving the different respective sensor outputs.

The object detector 1020 of the processing unit 1002 is configured to detect one or more objects in the environment of the user based on the sensor output received by the communication interface 1010 of the processing unit 1002. In some embodiments, if the sensor output includes images from a camera, the object detector 1020 is configured to perform image processing on the images to identify one or more objects in the images. For example, the object detector 1020 may be configured to identify a table, a chair, a bookshelf, a rug, a wall, a lamp, an item in a room, etc. Also, in some embodiments, the object being detected may be a part of an item, such as a corner, an rectilinear edge, a curvilinear edge, etc. In addition, in some embodiments, the object detector 1020 may be configured to perform image comparison or image searching to identify one or more objects. For example, the object detector 1020 may obtain a reference object from the non-transitory medium 1040 or from another device (e.g., a server), and may search a camera image to identify an image of the object having the same configuration as that of the reference object. In some cases, the object detector 1020 may compare a part of a camera image (e.g., in a sliding window) with an image of the reference object, and determine whether an image of an object in the camera image matches the image of the reference object. If so, then the object detector 1020 may determine that there is a presence of the object.

In some embodiments, the object detector 1020 may also identify a material or a type of material of an object detected in the camera image. For example, in addition to identifying an object in the environment being a chair, the object detector 1020 may also determine a material from which the chair is made from. By means of non-limiting examples, the object detector 1020 may determine that the chair is made from leather, a fabric, plastic, wood, or metal. In one implementation, the object detector 1020 may access a table of materials (which may be stored in the non-transitory medium 1040, or remotely in a server), which includes attributes of the materials, such as colors, textures, surface temperatures, etc. The object detector 1020 may identify the material by analyzing the camera image to see if the color and/or texture matches that in the table. Alternatively or additionally, the object detector 1020 may identify the material by comparing the surface temperature of the detected object with the surface temperatures of the materials in the table. The surface temperature of an object may be determined using infrared temperature sensor, laser temperature sensor, etc., which may be implemented at the image display device 2.

Also, in some embodiments, the object detector 1020 may be configured to determine a geometry of the identified object. In one implementation, the image display device 2 may include at least two cameras configured to capture images of objects from two different angles. The object detector 1020 may process images from the cameras to determine a three-dimensional configuration of each object in the environment. In other embodiments, the image display device 2 may include depth sensor(s). In such cases, the object detector 1020 may process depth information from the depth sensor(s) to determine three-dimensional configurations of the objects in the environment. In some cases, the object detector 1020 may be configured to determine surfaces of objects in the environment.

The graphic generator 1030 is configured to generate graphics for display on the screen of the image display device 2 based at least in part on the identified object(s) identified by the object identifier 1020. For example, the graphic generator 1030 may control the screen of the image display device 2 to display a virtual object such that the virtual object appears to be in the environment as viewed by the user through the screen. By means of non-limiting examples, the virtual object may be a virtual vehicle (e.g., a car, a plane, a space shuttle, a ship, a rocket, a submarine, a helicopter, a motorcycle, a bike, a tractor, an all-terrain-vehicle, a snowmobile), a virtual person (e.g., a cartoon, an image of a real person, etc.), a virtual tool, a virtual object in a room, a bullet, a missile, a fire, a heatwave, etc., etc. Also, in some embodiments, the graphic generator 1030 may generate an image of the virtual object for display on the screen such that the virtual object will appear to be interacting with the real physical object in the environment. For example, the graphic generator 1030 may cause the screen to display the image of the virtual object so that the virtual object appears to be supported by the physical object in the environment as viewed by the user through the screen of the image display device 2. As another example, the graphic generator 1030 may cause the screen to display the image of the virtual object so that the virtual object appears to be deforming or damaging the physical object in the environment as viewed by the user through the screen of the image display device 2. In some cases, such may be accomplished by the graphic generator 1030 generating an interaction image, such as an image of a deformation mark (e.g., a dent mark, a fold line, etc.), an image of a burnt mark, an image showing a heat-change, an image of a fire, an explosion image, a wreckage image, etc., for display by the screen of the image display device 2.

In some embodiments, different interaction images may be stored in the non-transitory medium 1040 and/or may be stored in a server that is in communication with the processing unit 1002. The interaction images may be stored in association with one or more attributes relating to interaction of two objects. For example, an image of a wrinkle may be stored in association with an attribute "blanket". In such cases, if the virtual object is displayed as being supported on a physical object that has been identified as a "blanket", then the graphic generator 1030 may display the image of the wrinkle between the virtual object and the physical object as viewed through the screen of the image display device 2, so that the virtual object appears to have made the blanket wrinkled by sitting on top of the blanket.

As another example, an image of a crack may be stored in association with an attribute "glass". In such cases, if the virtual object is displayed as being supported on a physical object that has been identified as a "glass", then the graphic generator 1030 may display the image of the crack between the virtual object and the physical object as viewed through the screen of the image display device 2, so that the virtual object appears to have cracked the glass.

As a further example, an image of a burnt mark may be stored in association with an attribute "vehicle thrust". In such cases, if a virtual vehicle is displayed as being in contact or in close proximity with a physical object, then the graphic generator 1030 may display the image of the burnt mark on the physical object as viewed through the screen of the image display device 2, so that the physical object appears to have burnt by the engine thrust of the virtual vehicle. As used in this specification, the term "close proximity" refers to a distance between two items that satisfies a criterion, such as a distance that is less than a certain pre-defined value (e.g., 5 cm, 1 cm, 5 mm, etc.).

It should be noted that the graphic generator 1030 is not limited to providing burnt mark as an interaction image, and that the graphic generator 1030 may be configured to provide other types of damage marks. For example, in some embodiments, the graphic generator 1030 may be configured to provide a more severe burnt mark, a burning image, smoke image, an explosion image, a wreckage image, etc. In some embodiments, the different types of damage marks may be used to indicate different degrees of damage caused by a virtual vehicle's thermal thrust.

In some embodiments, the different degrees of damage may be due to different durations of virtual interaction between the virtual vehicle and the real physical object. For example, if the virtual vehicle or its thrust thermal is in virtual contact, or is in virtual close proximity with the physical object for a first time period, the graphic generator 1030 may operate the screen of the image display device 2 to display a first burn mark so that the physical object appears burnt at the location where the virtual vehicle or its thrust thermal virtually interacted with the physical object. If the virtual vehicle or its thrust thermal is in virtual contact, or is in virtual close proximity with the physical object for a second time period longer than the first time period, the graphic generator 1030 may operate the screen of the image display device 2 to display a more sever burn mark so that the physical object appears more burnt at the location where the virtual vehicle or its thrust thermal virtually interacted with the physical object. If the virtual vehicle or its thrust thermal is in virtual contact, or is in virtual close proximity with the physical object for a third time period longer than the second time period, the graphic generator 1030 may operate the screen of the image display device 2 to display smoke image so that the physical object appears to be about to be ignited at the location where the virtual vehicle or its thrust thermal virtually interacted with the physical object. If the virtual vehicle or its thrust thermal is in virtual contact, or is in virtual close proximity with the physical object for a fourth time period longer than the third time period, the graphic generator 1030 may operate the screen of the image display device 2 to display a fire image so that the physical object appears to be on fire at the location where the virtual vehicle or its thrust thermal virtually interacted with the physical object. If the virtual vehicle or its thrust thermal is in virtual contact, or is in virtual close proximity with the physical object for a fifth time period longer than the fourth time period, the graphic generator 1030 may operate the screen of the image display device 2 to display an explosion image so that the physical object appears to have been exploded at the location where the virtual vehicle or its thrust thermal virtually interacted with the physical object.

Alternatively or additionally, the different degrees of damage may be due to different degrees of proximity between the virtual vehicle and the real physical object. For example, if the virtual vehicle or its thrust thermal has a first virtual proximity with the physical object, the graphic generator 1030 may operate the screen of the image display device 2 to display a first burn mark so that the physical object appears burnt. If the virtual vehicle or its thrust thermal has a second virtual proximity with the physical object that is closer than the first proximity, the graphic generator 1030 may operate the screen of the image display device 2 to display a more sever burn mark so that the physical object appears more burnt. If the virtual vehicle or its thrust thermal has a third virtual proximity with the physical object that is closer than the second proximity, the graphic generator 1030 may operate the screen of the image display device 2 to display smoke image so that the physical object appears to be about to be ignited. If the virtual vehicle or its thrust thermal has a fourth virtual proximity with the physical object that is closer than the third proximity, the graphic generator 1030 may operate the screen of the image display device 2 to display a fire image so that the physical object appears to be on fire. If the virtual vehicle or its thrust thermal has a fifth virtual proximity with the physical object that is closer than the fourth proximity, the graphic generator 1030 may operate the screen of the image display device 2 to display an explosion image so that the physical object appears to have been exploded.

The controller input 1050 of the processing unit 1002 is configured to receive user input from the controller component 4 and/or the controller component 6. In some embodiments, the user input is utilized by the processing unit 1002 to move the virtual object being presented in the screen of the image display device 2. For example, if the virtual object is a virtual vehicle, the handheld controller component 4 may be manipulated by the user to move the virtual vehicle in the screen, so that the virtual vehicle will appear to be moving in the real environment as viewed by the user through the screen of the image display device 2. In some embodiments, the handheld controller component 4 may be configured to move the virtual object in the two-dimensional display screen so that the virtual object will appear to be in motion in a virtual three-dimensional space. For example, in addition to moving the virtual object up, down, left, and right, the handheld controller component 4 may also move the virtual object in and out of a vision depth of the user.

In some embodiments, as the virtual object is being moved based on the user input received via the controller input 1050, the processing unit 1002 keeps track of the position of the virtual object with respect to one or more objects identified in the physical environment. In some cases, if the virtual object comes into contact, or in close proximity, with the physical object, the graphic generator 1030 may generate graphics to indicate an interaction between the virtual object and the physical object in the environment.

For example, in some embodiments, the virtual object may be a virtual vehicle with a thruster, wherein the position of the virtual vehicle is controllable by the handheld controller component 4. In such cases, if the virtual vehicle is virtually moved so that its thruster comes in contact, or in close proximity, with a real physical object as viewed through the screen of the image display device 2, the processing unit 1002 will operate the screen to display a burnt mark (example of an interaction image). The burnt mark is positioned in the screen so that it appears to be on the real physical object (as viewed through the screen of the image display device 2) at the location where the thruster of the virtual vehicle has contacted or has come into close proximity with the real physical object.

In some embodiments, the interaction image (e.g., the burnt mark) may be permanently associated with the location of the physical object. In such cases, the non-transitory medium 1040 may store information regarding the interaction image, including the type of interaction image (e.g., burnt mark, fire image, wreckage image, etc.), identifier of physical object on which the interaction image is virtually placed, position of the interaction image with respect to the physical object, or any combination of the foregoing. Accordingly, if the user later goes back to the same environment with the same physical object being present, the processing unit 1002 will operate the screen of the image display device 2 to present the interaction image (e.g., burnt mark) as though the burnt mark is permanently at the physical object.

In other embodiments, the interaction image (e.g., the burnt mark) is not permanent. Instead, the interaction image is temporarily displayed, and may disappear in the screen after a certain period. For example, in the situation in which the interaction image is fire, the processing unit 1002 may operate the screen to display a transformation (e.g., a video) of the fire so that the fire will appear to be gradually subsiding until it is gone. In such cases, a video showing the change of the interaction may be stored in the non-transitory medium 1040, or may be retrieved from another device (e.g., a server).

In some embodiments, the interaction image (e.g., burnt mark, fire image, wreckage image, etc.) may have a three-dimensional configuration, and/or may be based on a three-dimensional model. For example, the burnt mark may have a three-dimensional configuration. In such cases, depending on the viewing direction of the image display device 2 with respect to the physical object (that has the displayed burnt mark), the processing unit 1002 may adjust the presentation of the burnt mark so that it corresponds with the view direction.

Also, in some embodiments, the configuration (e.g., orientation, shape, etc.) of the interaction image may be based on a surface orientation and/or surface of the physical object. For example, if the physical object has a spherical shape, then the interaction image may have a curvilinear profile or curvilinear feature so that it appears to be on the curvilinear surface of the spherical object.

In some embodiments, the virtual vehicle may include one or more thrust thermal, envelope(s), like items 132, 134, 136 shown in FIGS. 8-9. The virtual vehicle may be displayed as having a first thrust thermal envelope 132 in response to the user operating the handheld controller component 4 to provide the virtual vehicle with a first power level. The virtual vehicle may be displayed as having a second thrust thermal envelope 134 in response to the user operating the handheld controller component 4 to provide the virtual vehicle with a second power level that is higher than the first power level. The virtual vehicle may be displayed as having a third thrust thermal envelope 136 in response to the user operating the handheld controller component 4 to provide the virtual vehicle with a third power level that is higher than the second power level. In some embodiments, the thrust thermal envelope 132/134/136 may be considered to be a part of the virtual vehicle. In other embodiments, the thrust thermal envelope 132/134/136 may be considered to be virtual object that is separate from the virtual vehicle.

In some embodiments, as the virtual vehicle is being moved based on the user input received via the controller input 1050, the processing unit 1002 keeps track of the position of the thrust thermal envelope 132/134/136 with respect to one or more objects identified in the physical environment. In some cases, if the thrust thermal envelope 132/134/136 comes into contact, or in close proximity, with the physical object, the graphic generator 1030 may generate graphics to indicate an interaction between the virtual object and the physical object in the environment. For example, if the virtual vehicle is virtually moved so that the thrust thermal envelope 132/134/136 (which moves together with the virtual vehicle) comes in contact, or in close proximity, with a real physical object as viewed through the screen of the image display device 2, the processing unit 1002 will operate the screen to display a burnt mark (example of an interaction image). The burnt mark is positioned in the screen so that it appears to be on the real physical object (as viewed through the screen of the image display device 2) at the location where the thrust thermal envelope 132/134/136 associated with the virtual vehicle has contacted or has come into close proximity with the real physical object.

In some embodiments, the processing unit 1002 may be configured to determine a virtual distance between a reference position associated with the graphical item (e.g., virtual object being displayed) and the physical object, and cause the screen to display an interaction image (e.g., heat visualization) upon a satisfaction of a criteria by the virtual distance. By means of non-limiting examples, the reference position associated with virtual object may be a position of a corner of the virtual object, a position of an edge of the virtual object, a position on a surface of the virtual object, a centroid or center of the virtual object, or a point located away from the virtual object. In the embodiments in which the virtual object is a virtual vehicle, the reference position associated with the virtual vehicle may be a position of a corner of the virtual vehicle, a position of an edge of the virtual vehicle, a position on a surface of the virtual vehicle, a centroid or center of the virtual vehicle, or a point located away from the virtual vehicle (for example, the point located away from the virtual vehicle may be a point at an edge of a thermal thrust envelope). Also, in some embodiments, the virtual distance may be measured between the reference position associated with the graphical item and a surface of the physical object.

It should be noted that the virtual object that can virtually interact with the real physical object is not limited to the examples described, and that the virtual object may be other items. By means of non-limiting examples, the virtual object may be a bullet, a missile, a laser beam, energy wave, a handheld weapon (e.g., a sword, an axe, a hammer, etc.). Also, as used in this specification, the term "virtual object" is not limited to virtualized physical items, and may refer to virtualization of any items, such as virtualized heat, virtualized sound energy, or any other virtualized energy.

As illustrated in the above embodiments, methods and apparatuses for displaying object image (virtual object) on a transparent screen of an image display device 2 are provided. The virtual object is displayed so that it appears to be interacting with real physical object as viewed by a user through the screen. Methods and apparatuses for displaying interaction image representing the interaction between the virtual object and the real physical object are also described herein. For example, as illustrated in the above embodiments, it is advantageous to provide an image of a feature that is resulted from a virtual interaction between the user-controllable object and the physical object. In some cases, the feature will appear to be a part of the physical object (e.g., a burnt mark, a wreckage, etc. at the physical object) in the environment, or will appear to be emanating from the physical object (e.g., as in the case of smoke, fire, or broken pieces flying away from the physical object). Providing interaction image is advantageous because it enhances the user's experience when using the image display device 2. In some cases, the interaction image may provide realism in representing the nature of interaction between the virtual object and the real physical object. In gaming applications, such features may provide a more enjoyable and fun experience for the user of the image display device 2.

Figure 11A:
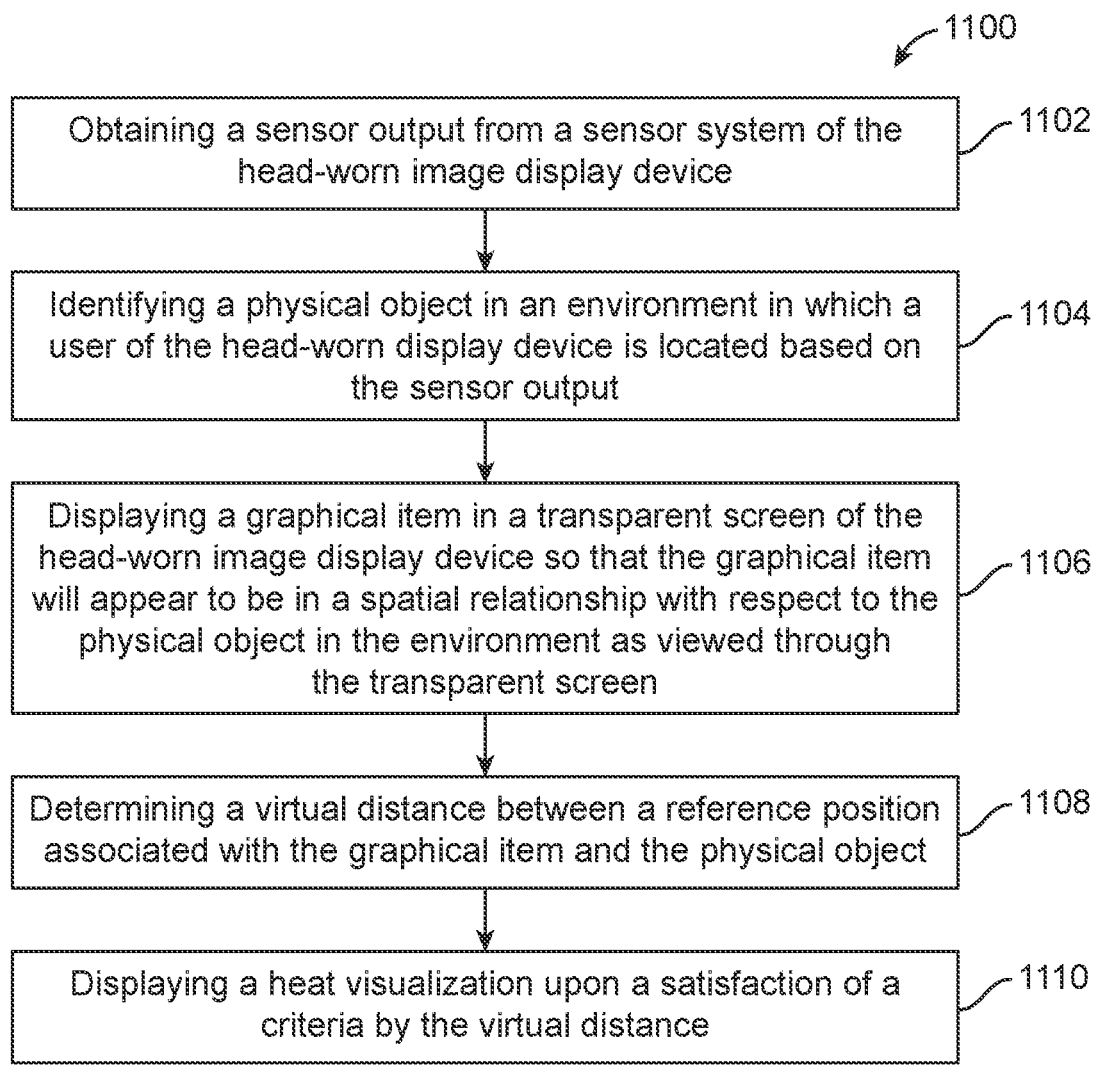
FIG. 11A illustrates a method performed by the processing unit of FIG. 10.

Method Performed by the Processing Unit and/or Application in the Processing Unit FIG. 11A illustrates a method 1100 in accordance with some embodiments. The method 1100 may be performed by an apparatus having an image display device (e.g., image display device 2) configured for head-worn by a user, the apparatus having a screen configured to present graphics for the user, a sensor system configured to sense a characteristic of an object in an environment in which the user is located, and a processing unit. In some embodiments, the method 1100 may be performed by any of the image display devices described herein. Also, in some embodiments, at least a part of the method 1100 may be performed by the processing unit 1002. The method 1100 includes: obtaining a sensor output from a sensor system of the head-worn image display device (item 1102); identifying a physical object in an environment in which a user of the head-worn display device is located based on the sensor output (item 1104); displaying, or causing a screen to display, a graphical item in a transparent screen of the head-worn image display device so that the graphical item will appear to be in a spatial relationship with respect to the physical object in the environment as viewed through the transparent screen (item 1106); determining a virtual distance between a reference position associated with the graphical item and the physical object (item 1108); and displaying, or causing the screen to display, a heat visualization upon a satisfaction of a criteria by the virtual distance (item 1110).

Optionally, in the method 1100, a configuration of the heat visualization is variable depending on the determined virtual distance between the reference position associated with the graphical item and the physical object.

Optionally, in the method 1100, the heat visualization has a first configuration when the virtual distance between the reference position associated with the graphical item and the physical object has a first value; and wherein the heat visualization has a second figuration when the virtual distance between the reference position associated with the graphical item and the physical object has a second value that is different from the first value.

Optionally, in the method 1100, the heat visualization comprises an image of a burnt mark positioned in correspondence with the physical object so that the physical object has an appearance of being burnt.

Optionally, in the method 1100, the heat visualization has a first configuration when the virtual distance between the reference position associated with the graphical item and the physical object is less than a first threshold.

Optionally, in the method 1100, the heat visualization has a second configuration that is different from the first configuration when the virtual distance between the reference position associated with the graphical item and the physical object is less than a second threshold, wherein the second threshold is less than the first threshold.

Optionally, in the method 1100, the first configuration of the heat visualization comprises a first burnt mark, and the second configuration of the heat visualization comprises a second burnt mark that is more severe than the first burnt mark.

Optionally, in the method 1100, the first configuration of the heat visualization comprises a burnt mark, and the second configuration of the heat visualization comprises an image of fire, an image of a destroyed structure, or an image of an explosion.

Optionally, the method 1100 further includes receiving a user input, and adjusting a position of the graphical item being displayed on the screen based on the user input.

Optionally, in the method 1100, the sensor system comprises a depth sensor configured to provide a sensor output; and wherein the virtual distance between the reference position associated with the graphical item and the physical object is determined based on the sensor output.

Optionally, in the method 1100, the sensor system comprises a camera configured to provide an image of the environment; and wherein the physical object is identified based on the image.

Optionally, in the method 1100, the graphical item comprises an image of a vehicle.

Optionally, in the method 1100, the graphical item comprises an image of a thrust.

Optionally, in the method 1100, the graphical item comprises an image of a vehicle, and wherein the method 1100 further comprises receiving a user input, and displaying a thrust visualization in association with the image of the vehicle in response to the user input.

Optionally, the method 1100 further includes changing the thrust visualization in response to a change in the user input.

Optionally, the method 1100 further includes displaying a transformation of the heat visualization so that the heat visualization disappears over time.

Optionally, in the method 1100, the heat visualization is displayed as a permanent overlay over the physical object.

Optionally, in the method 1100, the heat visualization comprises an image of a burnt mark.

Optionally, in the method 1100, the heat visualization comprises an image of an explosion.

Optionally, in the method 1100, the heat visualization comprises an image of a destroyed structure.

Optionally, in the method 1100, the heat visualization comprises an image of smoke.

In some embodiments, the method 1100 may be performed in response to a processing unit executing instructions stored in a non-transitory medium. Accordingly, in some embodiments, a non-transitory medium includes stored instructions, an execution of which by a processing unit of a head-worn image display device will cause a method to be performed, the method comprising: obtaining a sensor output from a sensor system of the head-worn image display device; identifying a physical object in an environment in which a user of the head-worn display device is located based on the sensor output; displaying a graphical item in a transparent screen of the head-worn image display device so that the graphical item will appear to be in a spatial relationship with respect to the physical object in the environment as viewed through the transparent screen; determining a virtual distance between a reference position associated with the graphical item and the physical object, and displaying a heat visualization upon a satisfaction of a criteria by the virtual distance.

Figure 11B:
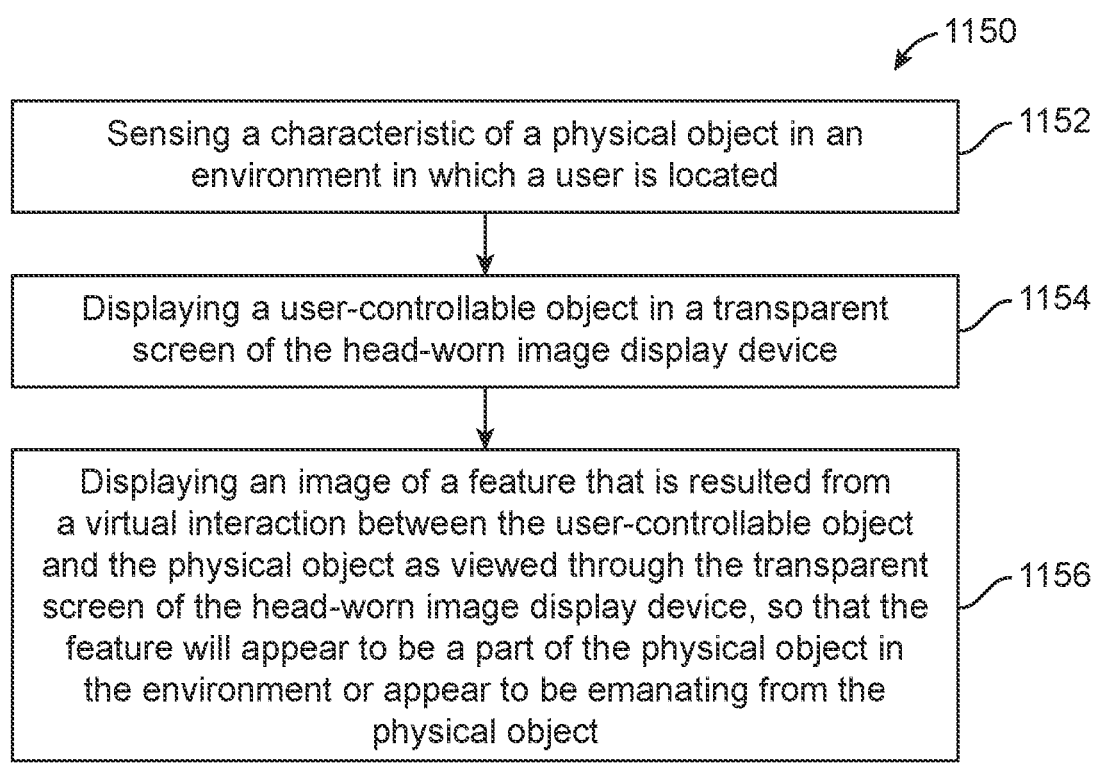
FIG. 11B illustrates another method performed by the processing unit of FIG. 10.

FIG. 11B illustrates another method 1150 in accordance with some embodiments. The method 1150 may be performed by an apparatus having an image display device (e.g., image display device 2) configured for head-worn by a user, the apparatus having a screen configured to present graphics for the user, a sensor system configured to sense a characteristic of an object in an environment in which the user is located, and a processing unit. In some embodiments, the method 1150 may be performed by any of the image display devices described herein. Also, in some embodiments, at least a part of the method 1150 may be performed by the processing unit 1002. The method 1150 includes: sensing a characteristic of a physical object in an environment in which a user is located (item 1152); displaying, or causing a screen to display, a user-controllable object in a transparent screen of the head-worn image display device (item 1154); and displaying, or causing the screen to display, an image of a feature that is resulted from a virtual interaction between the user-controllable object and the physical object as viewed through the transparent screen of the head-worn image display device, so that the feature will appear to be a part of the physical object in the environment or appear to be emanating from the physical object (item 1156).

Optionally, in the method 1150, the image of the feature comprises an image of a burnt mark for the physical object.

Optionally, in the method 1150, the image of the feature comprises an image of an explosion for the physical object.

Optionally, in the method 1150, the image of the feature comprises an image of a destroyed structure for the physical object.

Optionally, in the method 1150, the image of the feature comprises an image of smoke for the physical object.

Optionally, the method 1150 further includes displaying a transformation of the feature so that the feature disappears over time.

Optionally, in the method 1150, the image of the feature is displayed as a permanent overlay over the physical object.

Optionally, the method 1150 further includes changing a configuration of the image of the feature based on a viewing orientation of the user.

Optionally, in the method 1150, the virtual interaction between the user-controllable object and the physical object comprises a direction interaction or an indirect interaction.

Optionally, in the method 1150, the image of the feature comprises a heat visualization.

Optionally, in the method 1150, a configuration of the heat visualization is variable depending on a virtual distance between a reference position associated with the user-controllable object and the physical object.

Optionally, in the method 1150, the heat visualization has a first configuration when a virtual distance between a reference position associated with the user-controllable object and the physical object has a first value; and wherein the heat visualization has a second figuration when the virtual distance between the reference position associated with the user-controllable object and the physical object has a second value that is different from the first value.

Optionally, in the method 1150, the heat visualization has a first configuration when a virtual distance between the reference position associated with the user-controllable object and the physical object is less than a first threshold.

Optionally, in the method 1150, the heat visualization has a second configuration that is different from the first configuration when the virtual distance between the reference position associated with the user-controllable object and the physical object is less than a second threshold, wherein the second threshold is less than the first threshold.

Optionally, in the method 1150, the first configuration of the heat visualization comprises a first burnt mark, and the second configuration of the heat visualization comprises a second burnt mark that is more severe than the first burnt mark.

Optionally, in the method 1150, the first configuration of the heat visualization comprises a burnt mark, and the second configuration of the heat visualization comprises an image of fire, an image of a destroyed structure, or an image of an explosion.

Optionally, in the method 1150, the sensor system comprises a depth sensor configured to provide a sensor output; and wherein the method 1150 further includes determining a position of the physical object based on the sensor output.

Optionally, in the method 1150, the sensor system comprises a camera configured to provide an image of the environment; and wherein the method 1150 further includes identifying the physical object in the image.

Optionally, in the method 1150, the user-controllable object comprises an image of a vehicle.

Optionally, in the method 1150, the user-controllable object comprises an image of a thrust.

Optionally, in the method 1150, the user-controllable object comprises an image of a vehicle, and wherein the method 1150 further includes receiving a user input, and displaying a thrust visualization in association with the image of the vehicle in response to the user input.

Optionally, the method 1150 further includes displaying a change in the thrust visualization in response to a change in the user input.

Optionally, the method 1150 further includes receiving a user input, and adjusting a position of the user-controllable object being displayed on the screen based on the user input.

In some embodiments, the method 1150 may be performed in response to a processing unit executing instructions stored in a non-transitory medium. Accordingly, in some embodiments, a non-transitory medium includes stored instructions, an execution of which by a processing unit of a head-worn image display device will cause a method to be performed, the method comprising: sensing a characteristic of a physical object in an environment in which a user is located; displaying a user-controllable object in a transparent screen of the head-worn image display device, and displaying an image of a feature that is resulted from a virtual interaction between the user-controllable object and the physical object as viewed through the transparent screen of the head-worn image display device, so that the feature will appear to be a part of the physical object in the environment or appear to be emanating from the physical object.

Specialized Processing System

In some embodiments, the method 1100/1150 described herein may be performed by the system 1 (e.g., the processing unit 1002) executing an application, or by the application. The application may contain a set of instructions. In one implementation, a specialized processing system having a non-transitory medium storing the set of instruction for the application may be provided. The execution of the instruction by the processing unit 1102 of the system 1 will cause the processing unit 1102 and/or the image display device 2 to perform the features described herein. For example, in some embodiments, an execution of the instructions by a processing unit 1102 will cause the method 1100/1150 to be performed.

In some embodiments, the system 1, the image display device 2, or the apparatus 7 may also be considered as a specialized processing system. In particular, the system 1, the image display device 2, or the apparatus 7 is a specialized processing system in that it contains instruction stored in its non-transitory medium for execution by the processing unit 1102 to provide unique tangible effects in a real world. The features provided by the image display device 2 (as a result of the processing unit 1102 executing the instruction) provide improvements in the technological field of augmented reality and virtual reality.

Figure 12:
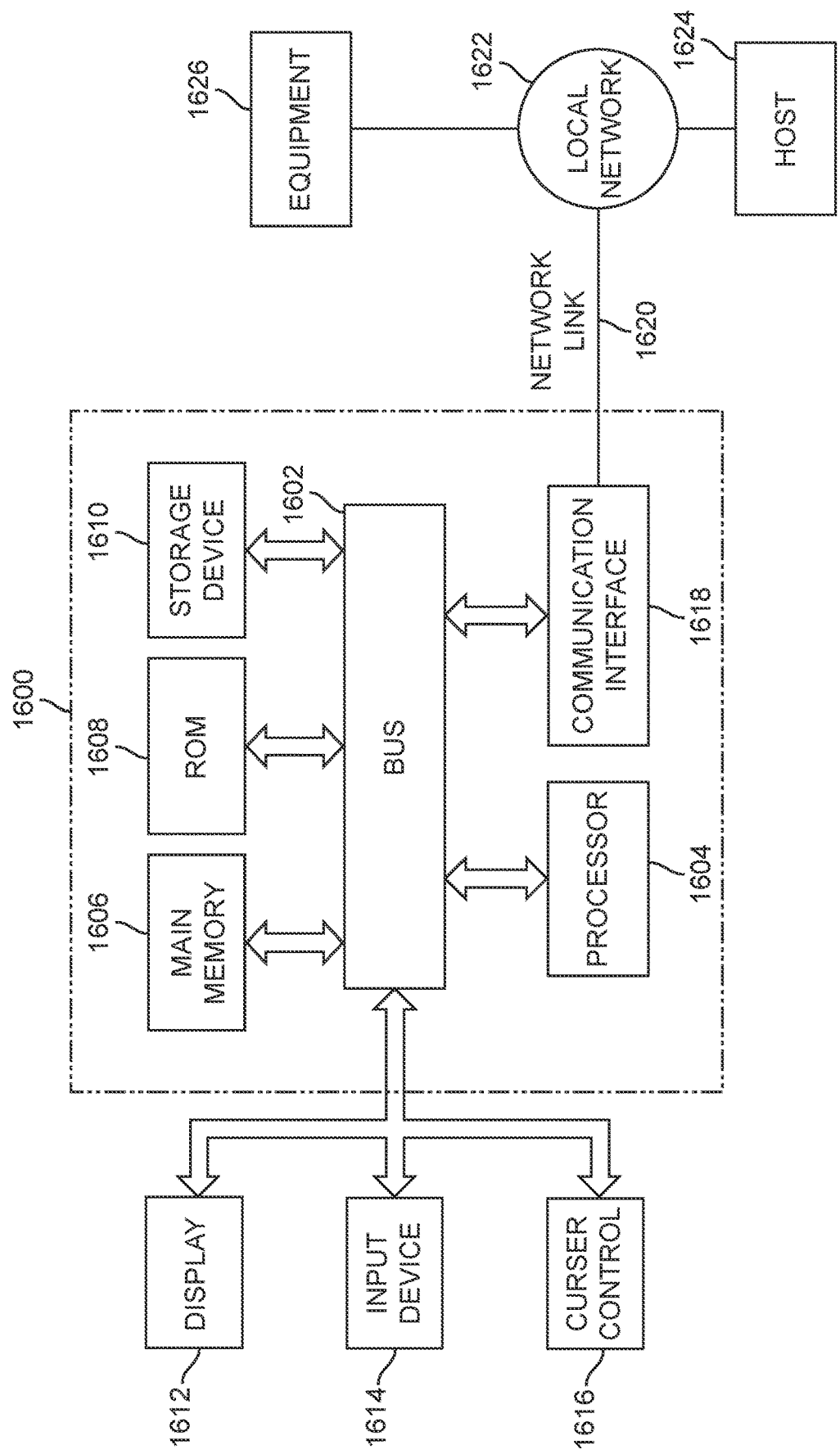
FIG. 12 illustrates a specialized processing system in accordance with some embodiments.

FIG. 12 is a block diagram illustrating an embodiment of a specialized processing system 1600 that can be used to implement various features described herein. For example, in some embodiments, the processing system 1600 may be used to implement at least a part of the system 1, e.g., the image display device 2, the processing unit 1002, etc. Also, in some embodiments, the processing system 1600 may be used to implement the processing unit 1102, or one or more components therein (e.g., the object detector 1020, the graphic generator 1030, etc.).

The processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the term "image", as used in this specification, may refer to image that is displayed, and/or image that is not in displayed form (e.g., image that is stored in a medium, or that is being processed).

Various exemplary embodiments are described herein. Reference is made to these examples in a non-limiting sense. They are provided to illustrate more broadly applicable aspects of the claimed invention. Various changes may be made to the embodiments described and equivalents may be substituted without departing from the true spirit and scope of the claimed invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the claimed inventions. All such modifications are intended to be within the scope of claims associated with this disclosure.

The embodiments described herein include methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

In addition, as used herein, a phrase referring to "at least one of" a list of items refers to one item or any combination of items. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. An apparatus configured to be head-worn by a user, comprising: a transparent screen configured to allow the user to see therethrough;
   a sensor system configured to sense a characteristic of a physical object in a physical environment in which the user is located; and
   a processing unit coupled to the sensor system,
   the processing unit configured to: cause the screen to display a graphical item so that the graphical item will appear to be in a spatial relationship with respect to the physical object in the physical environment, determine a virtual distance between a reference position associated with the graphical item and the physical object, and cause the screen to display a heat visualization upon a satisfaction of a criteria by the virtual distance between the reference position associated with the graphical item and the physical object,
   wherein the processing unit is configured to cause the screen to display the heat visualization in a positional relationship with the physical object as viewed through the screen, so that the heat visualization appears to be a part of the physical object, or emanating from the physical object, and
   wherein the physical object is a real object in the physical environment; wherein the processing unit is configured to determine a characteristic of the physical object while the physical object and the graphical item are both viewable by the user, the characteristic relating to a material of the physical object, and
   wherein the processing unit is configured to configure the heat visualization based on the characteristic relating to the material of the physical object, and
   wherein the processing unit is configured to configure the heat visualization based on the characteristic relating to the material of the physical object, and to cause the screen to display the configured heat visualization to indicate an interaction between the physical object and the graphical item as perceived by the user through the screen.

2. The apparatus of claim 1, wherein a configuration of the heat visualization is variable depending on the determined virtual distance between the reference position associated with the graphical item and the physical object.

3. The apparatus of claim 1, wherein the heat visualization has a first configuration when the virtual distance between the reference position associated with the graphical item and the physical object has a first value; and
   wherein the heat visualization has a second figuration when the virtual distance between the reference position associated with the graphical item and the physical object has a second value that is different from the first value.

4. The apparatus of claim 1, wherein the heat visualization comprises an image of a burnt mark positioned in correspondence with the physical object so that the physical object has an appearance of being burnt.

5. The apparatus of claim 1, wherein the heat visualization has a first configuration when the virtual distance between the reference position associated with the graphical item and the physical object is less than a first threshold.

6. The apparatus of claim 5, wherein the heat visualization has a second configuration that is different from the first configuration when the virtual distance between the reference position associated with the graphical item and the physical object is less than a second threshold, wherein the second threshold is less than the first threshold.

7. The apparatus of claim 6, wherein the first configuration of the heat visualization comprises a first burnt mark, and the second configuration of the heat visualization comprises a second burnt mark that is more severe than the first burnt mark.

8. The apparatus of claim 6, wherein the first configuration of the heat visualization comprises a burnt mark, and the second configuration of the heat visualization comprises an image of fire, an image of a destroyed structure, or an image of an explosion.

9. The apparatus of claim 1, wherein the processing unit is configured to receive a user input, and to adjust a position of the graphical item being displayed on the screen based on the user input.

10. The apparatus of claim 1, wherein the sensor system comprises a depth sensor configured to provide a sensor output; and
wherein the processing unit is configured to determine the virtual distance between the reference position associated with the graphical item and the physical object based on the sensor output.

11. The apparatus of claim 1, wherein the sensor system comprises a camera configured to provide an image of the physical environment; and
wherein the processing unit is configured to identify the physical object in the image.

12. The apparatus of claim 1, wherein the graphical item comprises an image of a vehicle.

13. The apparatus of claim 1, wherein the graphical item comprises an image of a thrust.

14. The apparatus of claim 1, wherein the graphical item comprises an image of a vehicle, and wherein the processing unit is also configured to receive a user input, and to cause the screen to display a thrust visualization in association with the image of the vehicle in response to the user input.

15. The apparatus of claim 14, wherein the processing unit is configured to cause the screen to display a change in the thrust visualization in response to a change in the user input.

16. The apparatus of claim 1, wherein the processing unit is configured to cause the screen to display a transformation of the heat visualization so that the heat visualization disappears over time.

17. The apparatus of claim 1, wherein the processing unit is configured to cause the screen to display the heat visualization as a permanent overlay over the physical object.

18. The apparatus of claim 1, wherein the heat visualization comprises an image of a burnt mark.

19. The apparatus of claim 1, wherein the heat visualization comprises an image of an explosion.

20. The apparatus of claim 1, wherein the heat visualization comprises an image of a destroyed structure.

21. The apparatus of claim 1, wherein the heat visualization comprises an image of smoke.

* * * * *